(12) United States Patent
Kondo et al.

(10) Patent No.: US 10,829,607 B2
(45) Date of Patent: Nov. 10, 2020

(54) MOLDED FOAM OF ESTER-BASED ELASTOMER, USES THEREOF, AND EXPANDED BEADS OF ESTER-BASED ELASTOMER

(71) Applicants: SEKISUI KASEI CO., LTD., Osaka (JP); TOYOBO CO., LTD., Osaka (JP)

(72) Inventors: Hirotaka Kondo, Nara (JP); Yuichi Gondoh, Nara (JP)

(73) Assignees: SEKISUI KASEI CO., LTD., Osaka (JP); TOYOBO CO., LTD., Osaka (JP)

( * ) Notice: Subject to any disclaimer, the term of this patent is extended or adjusted under 35 U.S.C. 154(b) by 0 days.

(21) Appl. No.: 16/317,168

(22) PCT Filed: May 1, 2017

(86) PCT No.: PCT/JP2017/017194
§ 371 (c)(1),
(2) Date: Jan. 11, 2019

(87) PCT Pub. No.: WO2018/012089
PCT Pub. Date: Jan. 18, 2018

(65) Prior Publication Data
US 2019/0300670 A1    Oct. 3, 2019

(30) Foreign Application Priority Data

Jul. 13, 2016  (JP) ................................ 2016-138785
Dec. 19, 2016  (JP) ................................ 2016-245638
Mar. 31, 2017  (JP) ................................ 2017-071741

(51) Int. Cl.
C08J 9/228  (2006.01)
A43B 13/04  (2006.01)
C08J 9/18  (2006.01)
C08J 9/14  (2006.01)

(52) U.S. Cl.
CPC ............... *C08J 9/228* (2013.01); *A43B 13/04* (2013.01); *C08J 9/18* (2013.01); *C08J 9/141* (2013.01); *C08J 9/146* (2013.01); *C08J 2367/02* (2013.01); *C08J 2371/00* (2013.01)

(58) Field of Classification Search
USPC .......................................................... 521/56
See application file for complete search history.

(56) References Cited

U.S. PATENT DOCUMENTS

| | | | |
|---|---|---|---|
| 2014/0259753 | A1 | 9/2014 | Watkins et al. |
| 2016/0121524 | A1 | 5/2016 | Däschlein et al. |
| 2016/0297943 | A1 | 10/2016 | Däschlein et al. |

FOREIGN PATENT DOCUMENTS

| | | |
|---|---|---|
| JP | 7-330939 | 12/1995 |
| JP | 2001-213991 | 8/2001 |
| JP | 2014-62213 | 4/2014 |
| WO | 2014/150122 | 9/2014 |
| WO | 2014/198779 | 12/2014 |
| WO | 2015/052265 | 4/2015 |
| WO | 2016/052387 | 4/2016 |

OTHER PUBLICATIONS

International Search Report dated Aug. 8, 2017 in International Application No. PCT/JP2017/017194.
Type and Grades of Pelprene R, 1996-2015 Toyobo Co., Ltd., retrieval date: Jul. 26, 2017 (Jul. 26, 2017), Pelprene R. no Kagaku Kozo.
Hytrel Polyester Elastomer Gijutsu Shiryo, Du Pont-Toray Co., Ltd., retrieval date: Jul. 26, 2017 (Jul. 26, 2017), p. 2, 1-2 Hytrel no Kagaku Kozo.
Supplementary European Search Report dated Nov. 7, 2019 in corresponding European Patent Application No. EP 17 82 7223.

*Primary Examiner* — Terressa Boykin
(74) *Attorney, Agent, or Firm* — Wenderoth, Lind & Ponack, L.L.P.

(57) ABSTRACT

An ester-based elastomer expanded molded article comprising a fusion of expanded particles that contain an ester-based elastomer as a base resin.

12 Claims, 19 Drawing Sheets

MOLDED FOAM OF ESTER-BASED ELASTOMER, USES THEREOF, AND EXPANDED BEADS OF ESTER-BASED ELASTOMER

TECHNICAL FIELD

The present invention relates to a molded foam of ester-based elastomer, uses thereof, and expanded beads of ester-based elastomer (an ester-based elastomer expanded molded article, use thereof and ester-based elastomer expanded particles). More specifically, the present invention relates to an ester-based elastomer expanded molded article showing high rebound resilience and low density, use thereof and ester-based elastomer expanded particles.

BACKGROUND ART

Expanded molded articles have been conventionally used as shock-absorbing materials and packing materials that are fusions of two or more expanded particles made of polystyrene, polypropylene or the like. Expanded molded articles that are fusions of two or more expanded particles can form complicated shapes, and thus are advantageous compared to expanded molded articles obtained by extrusion expansion. Expanded molded articles made of polystyrene, polypropylene or the like have a problem of being difficult to be used for applications requiring high rebound resilience. Therefore, there has been a need for expanded molded articles that can achieve high rebound resilience.

In response to the above need, Japanese Unexamined Patent Application Publication No. 2014-62213 (Patent Document 1) proposes an expanded molded article comprising expanded particles made of a thermoplastic polyurethane.

CITATION LIST

Patent Literatures

Patent Document 1: Japanese Unexamined Patent Application Publication No. 2014-62213

SUMMARY OF INVENTION

Technical Problems

Although thermoplastic polyurethanes can achieve a certain level of rebound resilience, it was difficult to achieve the same with low density. Therefore, there is a need for providing an expanded molded article having high rebound resilience even with low density.

Solution to Problems

The inventors of the present invention found that by using an ester-based elastomer for a base resin of fused expanded particles that form an expanded molded article, the expanded molded article provided has high rebound resilience even with low density, thereby achieving the present invention.

The inventors of the present invention also found ester-based elastomer expanded particles that can provide the expanded molded article, thereby achieving the present invention.

Accordingly, the present invention provides an ester-based elastomer expanded molded article including a fusion of expanded particles that contain an ester-based elastomer as a base resin.

The present invention also provides ester-based elastomer expanded particles containing an ester-based elastomer as a base resin and capable of providing an expanded molded article including a fusion of expanded particles.

Advantageous Effects of Invention

The ester-based elastomer expanded molded article of the present invention is formed with fused expanded particles that contain an ester-based elastomer as a base resin, and thus shows high rebound resilience even with low density.

It is also possible to provide an ester-based elastomer expanded molded article showing further high rebound resilience and low density in any of the following cases:
(1) the ester-based elastomer contains a hard segment and a soft segment, the hard segment is formed with a dicarboxylic acid component; and a dicarboxylic acid component and diol component, and the soft segment is an aliphatic polyether and/or polyester;
(2) the ester-based elastomer has a heat of crystallization of 0 to 30 mJ/mg;
(3) the ester-based elastomer contains the hard segment at 30 to 80% by mass;
(4) the dicarboxylic acid component contains a terephthalic acid component and a dicarboxylic acid component other than the terephthalic acid component and contains the dicarboxylic acid component other than the terephthalic acid component at 5 to 30% by mass;
(5) the dicarboxylic acid component other than the terephthalic acid component is an isophthalic acid component;
(6) the expanded particles in the fusion have an average cell diameter at a central part of 10 to 200 μm and an average cell diameter at a surface layer part of 50 to 300 μm;
(7) the ester-based elastomer expanded molded article shows a density of 0.02 to 0.4 g/cm³ and a rebound resilience of 50 to 100%; and
(8) the ester-based elastomer expanded molded article is used for any of an insole, a midsole and an outsole.

The ester-based elastomer expanded particles of the present invention can provide expanded particles that can provide the expanded molded article showing high rebound resilience and low density.

It is also possible to provide expanded particles that can provide an expanded molded article showing further high rebound resilience and low density in any of the following cases:
(a) the ester-based elastomer expanded particles fulfil any of the following requirements (i) to (v):
(i) the ester-based elastomer contains a hard segment and a soft segment, the hard segment is formed with a dicarboxylic acid component; and a dicarboxylic acid component and diol component, and the soft segment is an aliphatic polyether and/or polyester;
(ii) the ester-based elastomer has a heat of crystallization of 0 to 30 mJ/mg;
(iii) the ester-based elastomer contains the hard segment at 30 to 80% by mass;
(iv) the ester-based elastomer expanded particles are capable of providing an expanded molded article in which expanded particles in the fusion have an average cell diameter at a central part of 10 to 200 μm and an average cell diameter at a surface layer part of 50 to 300 μm; and
(v) the ester-based elastomer expanded particles are capable of providing an expanded molded article showing a density of 0.02 to 0.4 g/cm³ and a rebound resilience of 50 to 100%;

(b) the dicarboxylic acid component contains a terephthalic acid component and a dicarboxylic acid component other than the terephthalic acid component and contains the dicarboxylic acid component other than the terephthalic acid component at 5 to 30% by mass; and
(c) the dicarboxylic acid component other than the terephthalic acid component is an isophthalic acid component.

DESCRIPTION OF EMBODIMENTS

Figure 1:
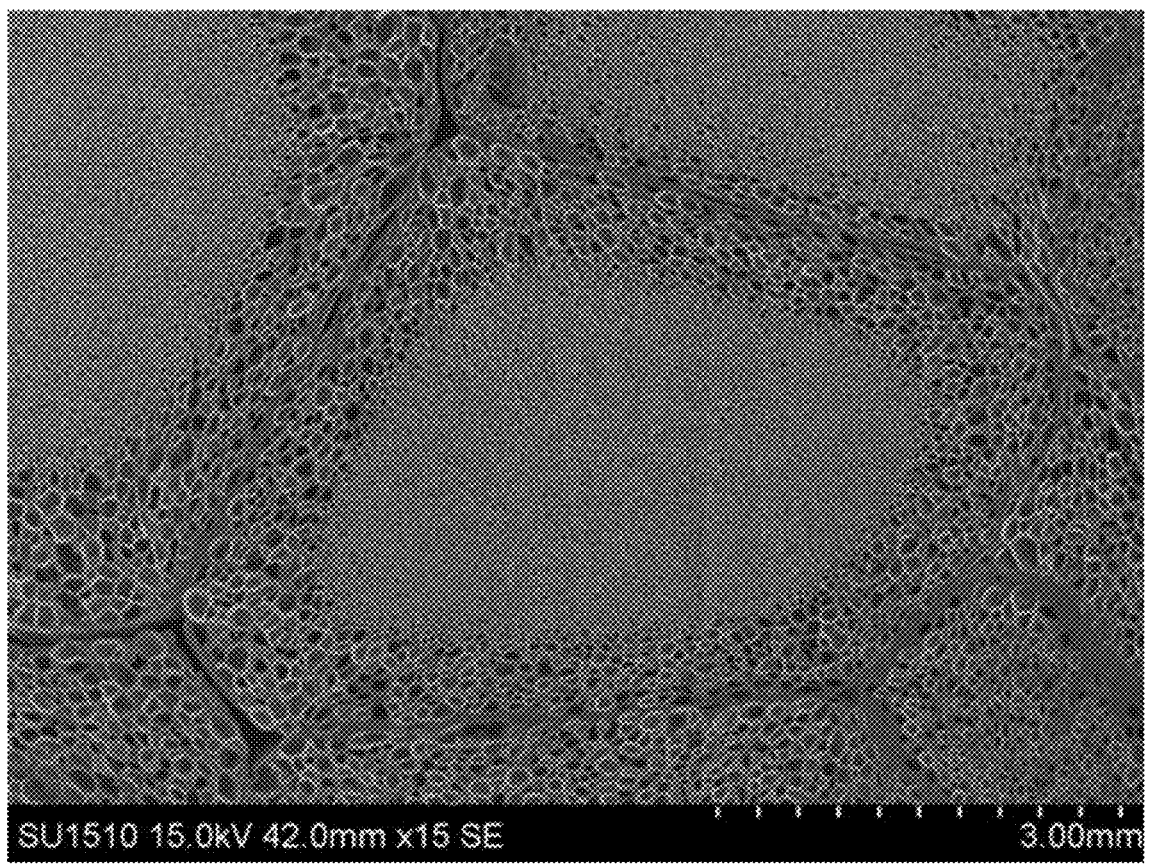
FIG. 1 is a sectional image of the expanded molded article of Example 1.

The ester-based elastomer expanded molded article (hereinafter merely referred to as expanded molded article) of the present invention includes a fusion of expanded particles containing an ester-based elastomer as a base resin.
(1) Ester-Based Elastomer
The ester-based elastomer is not particularly limited as far as the ester-based elastomer provides an expanded molded article showing high rebound resilience and low density. Examples thereof include an ester-based elastomer containing a hard segment and a soft segment.
The hard segment may be formed with, for example, a dicarboxylic acid component and/or a diol component. The hard segment may be formed with two types of components of a dicarboxylic acid component; and a dicarboxylic acid component and diol component.

Examples of the dicarboxylic acid component include components derived from aliphatic dicarboxylic acids such as oxalic acid, malonic acid and succinic acid and derivatives thereof, and aromatic dicarboxylic acids such as terephthalic acid, isophthalic acid and naphthalene dicarboxylic acid and derivatives thereof.
Examples of the diol component include $C_{2-10}$ alkylene glycols such as ethylene glycol, propylene glycol and butanediol (such as 1,4-butanediol), (poly)oxy$C_{2-10}$ alkylene glycols, $C_{5-12}$ cycloalkane diols, bisphenols and alkylene oxide adducts thereof. The hard segment may have crystallinity.
The soft segment used may be a polyester type and/or polyether type segment.
Examples of the polyester type soft segment include aliphatic polyesters such as polycondensation products between dicarboxylic acids (aliphatic $C_{4-12}$ dicarboxylic acids such as adipic acid) and diols ($C_{2-10}$ alkyleneglycols such as 1,4-butanediol and (poly)oxy $C_{2-10}$ alkylene glycols such as ethylene glycol), polycondensation products of oxycarboxylic acids and ring-opening polymerization products of lactones ($C_{3-12}$ lactones such as s-caprolactone). The polyester type soft segment may be amorphous. Specific examples of the polyester as the soft segment include caprolactone polymers, and polyesters between $C_{2-6}$ alkylene glycols and $C_{6-12}$ alkane dicarboxylic acids such as polyethylene adipate and polybutylene adipate. The polyester may have a number average molecular weight in the range of 200 to 15000, in the range of 200 to 10000 or in the range of 300 to 8000. The number average molecular weight may be 200, 300, 500, 1000, 3000, 5000, 8000, 10000, 12000 or 15000.
Examples of the polyether type soft segment include segments derived from aliphatic polyethers such as polyalkylene glycol (such as polyoxyethylene glycol, polyoxypropylene glycol and polyoxytetramethylene glycol). The polyether may have a number average molecular weight in the range of 200 to 10000, in the range of 200 to 6000 or in the range of 300 to 5000. The number average molecular weight may be 200, 300, 500, 1000, 2000, 4000, 5000, 6000, 8000 or 10000.
The soft segment may be a segment derived from polyesters having polyether units such as copolymers (polyetherpolyester) between aliphatic polyesters and polyethers, and polyesters between polyethers and aliphatic dicarboxylic acids such as polyoxyalkylene glycols (such as polyoxytetramethylene glycol).
The mass ratio between the hard segment and the soft segment may be 20:80 to 90:10, 30:70 to 90:10, 30:70 to 80:20, 40:60 to 80:20 or 40:60 to 75:25. The mass ratio may be 20:80, 25:75, 30:70, 40:60, 50:50, 60:40, 70:30, 75:25, 80:20 or 90:10.
When the dicarboxylic acid component contains a terephthalic acid component and a dicarboxylic acid component other than the terephthalic acid component, the ester-based elastomer may contain 30 to 80% by mass of hard segment and 5 to 30% by mass of dicarboxylic acid component other than the terephthalic acid component. The content of the hard segment may be 30% by mass, 35% by mass, 40% by mass, 45% by mass, 50% by mass, 55% by mass, 60% by mass, 65% by mass, 70% by mass, 75% by mass or 80% by mass. The content of the dicarboxylic acid component other than the terephthalic acid component may be 5 to 25% by mass, 5 to 20% by mass or 10 to 20% by mass. The proportion may be 5% by mass, 7% by mass, 10% by mass, 12% by mass, 15% by mass, 17% by mass, 20% by mass, 22% by mass or 25% by mass. The proportion of the dicarboxylic acid component may be obtained by quantitatively evaluating the NMR spectrum of the resin.

The dicarboxylic acid component other than the terephthalic acid component is preferably an isophthalic acid component. Including the isophthalic acid component tends to decrease crystallinity of the elastomer and may improve expansion moldability, thereby providing an expanded molded article having lower density.

The ester-based elastomer suitably used may be PELPRENE series and VYLON series elastomers manufactured by Toyobo Co., Ltd. It is particularly preferable to use PELPRENE series elastomers.

(2) Base Resin

The base resin may have a melting point of 100 to 200° C. When the melting point is above 200° C., it is difficult to soften during expansion and an expanded molded article having low density may not be obtained. When the melting point is lower than 100° C., shrinkage may occur after the pre-expansion step and molding may be difficult. The resin may have a melting point of 120 to 200° C. or 120 to 190° C. The melting point may be 100° C., 120° C., 130° C., 140° C., 150° C., 160° C., 170° C., 180° C., 190° C. or 200° C.

The base resin may have a heat of crystallization of 0 to 30 mJ/mg. When the heat of crystallization is above 30 mJ/mg, expansion moldability may decrease and it may be difficult to obtain an expanded molded article having low density. The heat of crystallization may be 3 to 30 mJ/mg, 6 to 30 mJ/mg or 9 to 30 mJ/mg. The heat of crystallization may be 0 mJ/mg, 3 mJ/mg, 6 mJ/mg, 9 mJ/mg, 10 mJ/mg, 15 mJ/mg, 20 mJ/mg, 25 mJ/mg or 30 mJ/mg.

The base resin may have a. D hardness of 65 or less. When the D hardness is above 65, it may be difficult to soften during expansion and an expanded molded article having low density may not be obtained. The D hardness may be 20 to 60, 25 to 60 or 30 to 60. The D hardness may be 0, 10, 15, 20, 25, 30, 35, 40, 45, 50, 55 or 60.

The base resin may contain a resin other than the ester-based elastomer within the range that does not deteriorate the effect of the present invention. The resin other than the ester-based elastomer may be a known thermoplastic resin or thermosetting resin.

The base resin may further contain a flame retardant, a colorant, an antistatic agent, a spreader, a plasticizer, a flame retardant auxiliary agent, a crosslinking agent, a filler, a lubricant or the like.

Examples of the flame retardant include hexabromocyclododecane, triallyl isocyanurate hexabromide and the like.

Examples of the colorant include inorganic pigments such as carbon black, graphite and titanium oxide, organic pigments such as phthalocyanine blue, quinacridone red and isoindolinone yellow, metal powder, specialty pigments such as pearl, dyes and the like.

Examples of the antistatic agent include polyoxyethylene alkylphenol ethers, stearic acid monoglycerides and the like.

Examples of the spreader include polybutene, polyethylene glycol, silicon oil and the like.

(3) Expanded Particles in a Fusion

The expanded molded article includes a fusion formed by fusion of two or more expanded particles containing an ester-based elastomer as a base resin.

The fusion as used herein refers to a fusion of expanded particles having a fusion rate of 1% or more in which, when a sectional image of the expanded molded article is taken under an electron microscope, 25% or more of the line of the boundary of the expanded particle having the largest sectional area attaches to other expanded particles. The proportion of the line attaching to other expanded particles may be 25%, 30%, 40%, 50%, 60%, 70%, 80%, 90% or 100%. The fusion rate may be 1%, 20%, 40%, 60%, 80% or 100%.

The expanded particles in the fusion may have an average particle diameter of 1 to 15 mm. The average particle diameter means an average of the values resulting from measurement of the maximum and minimum diameters of 20 expanded particles at a section of the fusion and calculation of (the maximum diameter+the minimum diameter)/2. The average particle diameter may be 1 mm, 3 mm, 5 mm, 7 mm, 10 mm, 12 mm or 15 mm.

The expanded particles in the fusion may have an average cell diameter at the central part of 10 to 200 μm and an average cell diameter at the surface layer part of 50 to 300 μm. When the average cell diameter is less than 10 μm, the expanded molded article may shrink. When the average cell diameter is more than 300 μm, fusion between expanded particles may deteriorate and the strength may decrease. The average cell diameter at the central part may be 10 μm, 30 μm, 50 μm, 70 μm, 100 μm, 130 μm, 150 μm, 170 μm or 200 μm. The average cell diameter at the surface layer part may be 50 μm, 70 μm, 100 μm, 130 μm, 150 μm, 170 μm, 200 μm, 250 μm or 300 μm. The average cell diameter may be smaller at the central part than at the surface layer part.

The central part and the surface layer part as used herein mean the following regions A and B, respectively. Namely, an image of a cutting plane of an expanded molded article is taken with 15-fold magnification. The image is printed onto A4 paper and from the printed image, an expanded particle having a sectional area as big as possible is selected. On the selected expanded particle, a minimum diameter and a maximum diameter passing through the center are drawn. From the center, a circle is drawn having a ⅖ radius based on the minimum diameter. The inside of the drawn circle is regarded as the central part, region A. Separately, from the center, a circle is drawn having a 13/15 radius based on the maximum diameter. The outside of the drawn circle is regarded as the surface layer part, region B. The average cell diameter means the value as measured according to the method described in Examples.

(4) Expanded Molded Article

The expanded molded article may have a density of 0.02 to 0.4 g/cm$^3$. When the density is more than 0.4 g/cm$^3$, the expanded molded article may not have light weight. When the density is less than 0.02 g/cm$^3$, the expanded molded article may shrink to have poor appearance or may have decreased strength. The density may be in the range of 0.04 to 0.4 g/cm$^3$, in the range of 0.06 to 0.4 g/cm$^3$ or in the range of 0.06 to 0.3 g/cm$^3$. The density may be 0.02 g/cm, 0.04 g/cm$^3$, 0.06 g/cm$^3$, 0.1 g/cm$^3$, 0.2 g/cm$^3$, 0.3 g/cm$^3$ or 0.4 g/cm$^3$.

The expanded molded article may have a rebound resilience of 50 to 100%. When the rebound resilience is less than 50%, it may be difficult to use the expanded molded article for an application that requires rebound resilience. The rebound resilience may be 50%, 60%, 70%, 80%, 90% or 100%.

The expanded molded article may have a closed cell rate of 60 to 100%. When the closed cell rate is less than 60%, internal pressure may be difficult to be applied and deteriorate moldability. The closed cell rate may be in the range of 65 to 100% or in the range of 70 to 100%. The closed cell rate may be 65%, 70%, 75%, 80%, 85%, 90%, 95% or 100%.

The expanded molded article may have a compression set of 0 to 15%. When the compression set is more than 15%, it may be difficult to use the expanded molded article under an environment with compression stress. The compression set may be in the range of 0 to 13% or in the range of 0 to 11%. The compression set may be 0%, 2%, 4%, 6%, 8%, 11%, 13% or 15%.

The expanded molded article may have a 25% compression stress of 30 kPa or more and a 50% compression stress of 100 kPa or more. When the 25% compression stress is less than 30 kPa and the 50% compression stress is less than 100 kPa, it may be difficult to use the expanded molded article under an environment with compression stress. The 25% compression stress may be in the range of 30 to 300 kPa, and the 50% compression stress may be in the range of 50 to 500 kPa. The 25% compression stress may be 30 kPa, 100 kPa, 300 kPa, 700 kPa or 1000 kPa. The 50% compression stress may be 30 kPa, 100 kPa, 500 kPa, 700 kPa or 1000 kPa.

The expanded molded article may have a C hardness of 20 or more. When the C hardness is less than 20, the expanded molded article may have reduced shape stability. The C hardness may be in the range of 20 to 65, in the range of 20 to 60 or in the range of 20 to 55. The C hardness may be 20, 30, 40, 50, 55, 60 or 65.

The expanded molded article may have a fusion rate of 5 to 100%. When the fusion rate is less than 5%, the expanded molded article may not have sufficient strength. When the fusion rate is 5 to 100%, the expanded molded article may have sufficient strength. The fusion rate may be 10 to 100%, 15 to 100% or 20 to 100%. The fusion rate may be 5%, 10%, 15%, 20%, 25%, 30%, 50%, 70% or 100%.

The expanded molded article may be used for, for example, midsoles, insoles and outsoles that form soles of shoes; core materials of hitting tools for sports such as rackets and bats; protecting tools for sports such as pads and protectors; medical, nursing care, welfare and healthcare products such as pads and protectors; tire core materials of bicycles and wheelchairs; interior materials, seat core materials, shock-absorbing units and vibration-absorbing units of transport machines such as automobiles; shock-absorbing materials such as fenders and floats; toys; floor base materials; wall materials; rail vehicles; airplanes; beds; cushions; and the like.

The expanded molded article of the present invention may be used for any or all of a midsole, an insole and an outsole. Any of the midsole, insole and outsole that does not contain the expanded molded article of the present invention may be a well-known midsole, insole or outsole.

The expanded molded article may have an appropriate shape according to the application.

(5) Production Method of the Expanded Molded Article

The expanded molded article may be obtained by molding the expanded particles in a die, and includes a fusion of two or more expanded particles. For example, a closed metal die having many small pores may be filled with expanded particles (pre-expanded particles), and the expanded particles may be heated and expanded with pressurized water vapor to fill gaps between the expanded particles and fuse and unify the expanded particles to unify, thereby obtaining the expanded molded article. The density of the expanded molded article may be adjusted by, for example, adjusting the amount of the expanded particles filling the metal die.

Further, the expanded particles may be impregnated with inert gas or air (hereinafter referred to as inert gas or the like) in order to increase the expansion power of the expanded particles (internal pressure application step). By increasing the expansion power, fusion properties of the expanded particles may improve during molding in a die, thereby providing an expanded molded article having further improved mechanical properties. Examples of the inert gas include carbon dioxide, nitrogen, helium, argon and the like.

Examples of a method for impregnating the expanded particles with inert gas or the like include a method in which the expanded particles are placed in an atmosphere of inert gas or the like at or above normal pressure to impregnate the expanded particles with inert gas or the like. The expanded particles may be impregnated with inert gas or the like before filling a metal die, or the expanded particles may be impregnated by placing a metal die containing the expanded particles in an atmosphere of inert gas or the like. When the inert gas is nitrogen, the expanded particles may be left in a nitrogen atmosphere with 0.1 to 2 MPa gauge pressure (based on atmospheric pressure) for 20 minutes to 24 hours.

When the expanded particles are impregnated with inert gas or the like, the expanded particles may be heated and expanded in the metal die. However, the expanded particles may be heated and expanded before filling a metal die to obtain expanded particles having low bulk density which may then fill a metal die and may be subjected to heating and expansion. By using the expanded particles having low bulk density, an expanded molded article obtained may have low density.

When a coalescence inhibitor described hereinbelow is used during production of the expanded particles, the expanded particles containing the coalescence inhibitor attached thereto may be molded during production of the expanded molded article. In order to promote fusion of the expanded particles, the coalescence inhibitor may be washed off and removed before the molding step or a fusion promoting agent such as stearic acid may be added during molding with or without removing the coalescence inhibitor.

(a) Production Method of Expanded Particles

The expanded particles of the present invention are expanded particles that contain an ester-based elastomer as a base resin and can provide an expanded molded article including a fusion of the expanded particles.

The expanded particles preferably fulfil any of the following requirements (i) to (v):

(i) the ester-based elastomer contains a hard segment and a soft segment, the hard segment is formed with a dicarboxylic acid component; and a dicarboxylic acid component and diol component, and the soft segment is an aliphatic polyether and/or polyester;

(ii) the ester-based elastomer has a heat of crystallization of 0 to 30 mJ/mg;

(iii) the ester-based elastomer contains the hard segment at 30 to 80% by mass;

(iv) the expanded particles are capable of providing an expanded molded article in which expanded particles in the fusion have an average cell diameter at a central part of 10 to 200 μm and an average cell diameter at a surface layer part of 50 to 300 μm; and (v) the expanded particles are capable of providing an expanded molded article showing a density of 0.02 to 0.4 $g/cm^3$ and a rebound resilience of 50 to 100%.

It is also preferable that the dicarboxylic acid component contains a terephthalic acid component and a dicarboxylic acid component other than the terephthalic acid component and contains the dicarboxylic acid component other than the terephthalic acid component at 5 to 30% by mass.

Further, the dicarboxylic acid component other than the terephthalic acid component is preferably an isophthalic acid component.

The requirements and the details for the dicarboxylic acid component are the same as the corresponding details for the expanded molded article.

The expanded particles may be obtained through a step of expanding expandable particles (expansion step).

The expanded particles may have a bulk density in the range of 0.015 to 0.4 g/cm$^3$ When the bulk density is less than 0.015 g/cm$^3$, the obtained expanded molded article may shrink to result in poor appearance, and the expanded molded article may have decreased mechanical properties. When the bulk density is more than 0.4 g/cm$^3$, the expanded molded article may not have light weight. The bulk density may be 0.03 to 0.4 g/cm$^n$ or 0.05 to 0.4 g/cm$^3$.

The expanded particles may have any shape without limitation, and examples of the shape include sphere, ellipsoid (oval), circular cylinder, rectangular cylinder, pellet, granular and the like.

The expanded particles may have an average particle diameter of 1 to 15 mm. When the average particle diameter is less than 1 mm, it may be difficult to produce expanded particles per se and the production cost may increase. When the average particle diameter is more than 15 mm, the filling property in a metal die may decrease during preparation of the expanded molded article by molding in the die. The average particle diameter (excluding the average particle diameter of expanded particles in a fusion) of expanded particles means an average of the values resulting from measurement of the maximum and minimum diameters of 20 expanded particles and calculation of (the maximum diameter+the minimum diameter)/2.

In the expansion step, the expansion temperature and the heating medium are not particularly limited as far as the expandable particles may be expanded to obtain expanded particles.

The expanded particles may be prepared by a method for obtaining expanded particles including feeding resin particles, water, a dispersant, a blowing agent and the like to an autoclave, heating the same to impregnate the resin particles with the blowing agent followed by releasing into low pressure from the autoclave (release expansion) or a method for obtaining expanded particles including feeding a base resin, a blowing agent and the like to an extruder, melt-kneading the same and extruding into lower pressure than in the extruder for expansion and cutting (extrusion expansion).

In the expansion step, a coalescence inhibitor may be added to the expandable particles. The amount of the coalescence inhibitor added may be, relative to 100 parts by mass of expandable particles, in the range of 0.03 to 0.3 parts by mass or in the range of 0.05 to 0.25 parts by mass. When the coalescence inhibitor is less than 0.03 parts by mass, sufficient coalescence inhibition may not be obtained. When the coalescence inhibitor is more than 0.3 parts by mass, the expanded molded article may have decreased strength or the washing cost may increase.

Before expansion, metal soap powder such as zinc stearate, calcium carbonate or aluminum hydroxide may be applied on the surface of the expandable particles. The application may decrease bonding between expandable particles in the expansion step. Alternatively, a surface treating agent such as an antistatic agent or a spreader may be applied.

(b) Production Method of Expandable Particles

The expandable particles may be obtained through a step of impregnating resin particles with a blowing agent to obtain expandable particles (impregnation step).

The blowing agent may be organic gas or inorganic gas. Examples of inorganic gas include air, nitrogen and carbon dioxide (carbonic acid gas). Examples of organic gas include hydrocarbons such as propane, butane and pentane and fluorine-containing blowing agents. The blowing agent used may be only one type or two or more in combination.

The amount of the blowing agent in the base resin may be, relative to 100 parts by mass of the base resin, 1 to 12 parts by mass. When the amount is less than 1 part by mass, expansion power may decrease and favorable expansion may not be obtained. When the content of the blowing agent is more than 12 parts by mass, the membranes of cells may be damaged, plasticization effect may be excessive, the viscosity during expansion may decrease and shrinkage may occur. The amount of the physical blowing agent may be 5 to 12 parts by mass. The amount within the range allows a sufficient increase of expansion power and further favorable expansion.

A method for impregnating resin particles with a physical blowing agent may be any well-known methods. Examples thereof include a wet impregnation method and a dry impregnation method. The wet impregnation method is a method in which resin particles, a dispersant and water are fed in an autoclave and stirred to disperse the resin particles in water and produce a dispersion and a blowing agent is injected in the dispersion to impregnate the resin particles with the blowing agent. The dry impregnation method is a method in which a blowing agent is injected in resin particles in an autoclave to impregnate the resin particles with the blowing agent.

The dispersant is not particularly limited and examples thereof include sparingly water soluble inorganic substances such as calcium phosphate, magnesium pyrophosphate, sodium pyrophosphate and magnesium oxide and surfactants such as sodium dodecylbenzenesulfonate.

When the temperature at which resin particles are impregnated with a physical blowing agent is low, the time required for impregnation of resin particles with the physical blowing agent may be extended, causing decreased production efficiency. When the temperature is high, resin particles may fuse each other to produce bonded particles. The impregnation temperature may be −20 to 120° C., 0 to 120° C., 20 to 120° C. or 40 to 120° C. The physical blowing agent may be used in combination with a blowing auxiliary agent (plasticizer) or a cell regulator.

Examples of the blowing auxiliary agent (plasticizer) include diisobutyl adipate, toluene, cyclohexane, ethylbenzene and the like.

Examples of the cell regulator include higher fatty acid amides, higher fatty acid bisamides, higher fatty acid salts, inorganic cell nucleating agents and the like. The cell regulator may be more than one type in combination.

Examples of the higher fatty acid amide include stearamide, 12-hydroxystearamide and the like.

Examples of the higher fatty acid bisamide include ethylenebis(stearamide), methylenebis(stearamide) and the like.

Examples of the higher fatty acid salt include calcium stearate and the like.

Examples of the inorganic cell nucleating agent include talc, calcium silicate, synthetic or naturally produced silicon dioxide and the like.

In addition to the above, a cell regulator that may serve as a chemical foaming agent may be used. Examples of such a cell regulator include sodium bicarbonate-citric acid, sodium hydrogen carbonate, azodicarbonamide, dinitrosopentamethylenetetramine, benzenesulfonyl hydrazide, hydrazodicarbonamide and the like.

The content of the cell regulator may be, relative to 100 parts by mass of the expandable particles, 0.005 to 2 parts by mass or 0.01 to 1.5 parts by mass. When the cell regulator is less than 0.005 parts by mass, control of the diameter of cells may be difficult. When the cell regulator is more than 2 parts by mass, resin properties may be modified and the molded article may have, for example, decreased strength.

(c) Resin Particles

The shape of the resin particles is not particularly limited and examples thereof include sphere, ellipsoid (oval), circular cylinder, rectangular cylinder, pellet, granular and the like.

The resin particles may be raw material pellets without further processing or may be those obtained by re-pelleting to any size and shape.

The resin particles may have a length of 0.5 to 5 mm and an average diameter of 0.5 to 5 mm. When the length is less than 0.5 mm and the average diameter is less than 0.5 mm, the expandable particles obtained therefrom may have low gas retention and thus expansion may be difficult. When the length is more than 5 mm and the average diameter is more than 5 mm, heat does not reach inside during expansion and thus fused expanded particles may have cores. The length L and the average diameter D of resin particles are measured with calipers as follows: the length of resin particles along the extrusion direction of re-pelleting is regarded as the length L, and an average of the minimum diameter and the maximum diameter of resin particles in the direction perpendicular to the extrusion direction is regarded as the average diameter D. When raw material pellets are used without further processing, the longest diameter of the resin particles is regarded as the length L and an average of the minimum diameter and the maximum diameter in the direction perpendicular to the longest diameter direction is regarded as the average diameter D.

EXAMPLES

The present invention is hereinafter more specifically described by way of Examples which do not limit the present invention.

<Melting Point, Crystallization Temperature and Heat of Crystallization of Resin Particles>

The measurements were in accord with JIS K7121:1987, 2012 "Testing methods for transition temperatures of plastics" and JIS K7122:1987, 2012 "Testing methods for heat of transitions of plastics". Sampling and temperature conditions were as follows. The bottom of an aluminum measurement container was filled with about 6 mg of sample without a gap and on a differential scanning calorimeter (DSC6220 ASD-2, manufactured by SII nanotechnology, Inc., or DSC7000X AS-3, manufactured by Hitachi High-Tech Science Corporation), the sample was, under nitrogen flow of 20 mL/min, cooled from 30° C. to −70° C., retained for 10 minutes, heated from −70° C. to 220° C. (1st Heating), retained 10 minutes, cooled from 220° C. to −70° C. (Cooling), retained for 10 minutes and then heated from −70° C. to 220° C. (2nd Heating), thereby obtaining a DSC curve. When a melting peak was not observed in the range of −70 to 220° C., the upper limit of the 1st and 2nd Heating was established with the melting point Tm+40° C. as a guide. For example, polyethylene terephthalate was heated from −70° C. to 290° C. All heating and cooling were performed at a rate of 10° C./min and the standard substance used was alumina. The melting point as in the present invention was the temperature of the highest melting peak top observed during the process of 2nd Heating which was read with an analytical software attached to the calorimeter. The crystallization temperature was the temperature of the crystallization peak top at the highest temperature side observed during the process of Cooling which was read with an analytical software attached to the calorimeter. The heat of crystallization was calculated from the area surrounded by the DSC curve and a line connecting a point at which the DSC curve leaves the baseline on the high temperature side and a point at which the DSC curve returns to the baseline on the low temperature side, by using an analytical software attached to the calorimeter.

<D Hardness of Resin Particles>

Resin particles were heat-pressed at a temperature of the melting point Tm+20° C. to prepare a smooth film having a thickness of 3 mm or more. The film was conditioned in an environment of a temperature of 23±2° C. and a humidity of 50±5% for 72 hours or more, followed by measurement on a hardness tester (Teclock Durometer type D, manufactured by Teclock Corporation). The pressurizing plane was closely attached so that the indenter is perpendicular to the measurement plane of the specimen, and the scale was immediately read. The sample was measured at 5 points and the average was obtained as the D hardness.

<Bulk Density of Expanded Particles>

Expanded particles as a measurement sample were weighed for the mass W (g). The measurement sample was allowed to fall freely in a measuring cylinder, the bottom of the measuring cylinder was tapped to level the volume to determine a nominal volume V (cm³) of the sample. The bulk density of the expanded particles was calculated according to the following equation:

Bulk density (g/cm³)=Mass $W$ of the measurement sample/Volume $V$ of the measurement sample <Density of Expanded Molded Article>

An expanded molded article immediately after molding was dried at 40° C. for 12 hours and conditioned in an environment of a temperature of 23±2° C. and a humidity of 50±5% for 72 hours after drying. The conditioned expanded molded article was weighed for the mass a (g) to two places of decimals and measured for the outer dimension to 1/100 mm with a digimatic caliper (manufactured by Mitutoyo Corporation) to determine a nominal volume b (cm³). The density of the expanded molded article was calculated according to the following equation:

Density of expanded molded article (g/cm³)=$a/b$

<Average Cell Diameter (Surface Layer Part) and Average Cell Diameter (Central Part) of Expanded Molded Article>

The expanded molded article was measured for the average cell diameter according to the following method. Specifically, three specimens (thickness: 1 mm) were sectioned from an expanded molded article with a blade and images of the cutting planes were taken with 15-fold magnification on a scanning electron microscope (S-3000N, manufactured by Hitachi, Ltd., or S-3400N, manufactured by Hitachi High-Technologies Corporation). The images were printed on A4 paper and from each of the printed images, an expanded particle having a sectional area as big as possible was selected. On the selected expanded particle, a minimum diameter and a maximum diameter passing through the center were drawn. From the center, a circle was drawn having a ⅖ radius based on the minimum diameter. The inside of the drawn circle was regarded as the central part, region A. Separately, from the center, a circle was drawn having a 13/15 radius based on the maximum diameter. The outside of the drawn circle was regarded as the surface layer part, region B.

An arbitrary line was drawn so that the line contacted with 20 or more cells in the region A, the length L of the line was measured and the number N of cells that contacted with the line was counted. When a line contacting with 20 cells could not be drawn, the longest line in the region was drawn. This arbitrary line was carefully drawn so that the line did not contact with a cell only at a point at which the cell contacted with a neighboring cell. However, when the line contacted with the cell at the point described above, the neighboring cell was also counted. When a cell is too small to be counted, an image magnified 15 times or more may be used, and when an expanded particle is too big to be fit in the 15-fold magnified image, an image magnified less than 15 times may be used. From the results of the measurements, an average subtense length t and a cell diameter D were calculated according to the following equations.

Average subtense length $t$=Line length $L$/(Number of cells $N$×Magnification of the image)

Cell diameter $D$=Average subtense length $t$/0.616

Each specimen were subjected to the same measurement and the arithmetic average thereof was regarded as the average cell diameter (central part).

The same calculation was carried out for the region B, and the arithmetic average thereof was regarded as the average cell diameter (surface layer part).

<Closed Cell Rate of Expanded Molded Article>

While leaving skin layers on two planes perpendicular to the thickness direction, an expanded molded article was cut to 25×25×thickness 20 mm, conditioned in an environment of JIS K7100:1999, symbol 23/50, class 2 for 16 hours followed by measurement in an environment of JIS K7100: 1999, symbol 23/50, class 2. The obtained specimen was weighed for the mass (g) to two places of decimals and measured for the outer dimension to $\frac{1}{100}$ mm with a digimatic caliper (manufactured by Mitutoyo Corporation) to determine a nominal volume A (cm³). Next, the measurement sample was determined for the volume B (cm³) with an air pycnometer (type 1000, manufactured by Tokyoscience Co., Ltd.) according to a 1-1/2-1 atmosphere method. According to the following equation, the closed cell rate (%) was calculated and an average for 5 specimens was regarded as the closed cell rate (%). The air pycnometer was calibrated with standard spheres (large: 28.96 cc, small: 8.58 cc). The density of the resins was as follows: VYLON GM-913, VYLON GM-915 and PELPRENE P-55B: 1.15 g/cm³, PELPRENE GP-400: 1.12 g/cm³, PELPRENE GP-475: 1.17 g/cm³, PELPRENE GP-600: 1.19 g/cm³, polyurethane: 1.20 g/cm³ and polyethylene terephthalate: 1.39 g/cm³³.

Closed cell rate (%)=$(B-$(Mass of specimen/Density of resin))/$A$×100

<Rebound Resilience of Expanded Molded Article>

The rebound resilience was measured according to JIS K 6400-3:2011. Two samples of 50×50×thickness 20 mm which were sectioned from one expanded article and conditioned in an environment of a temperature of 23±2° C. and a humidity of 50±5% for 72 hours or more were stacked and attached to a rebound resilience tester (FR-2, manufactured by Kobunshi Keiki Co., Ltd.), a steel ball (φ ⅝ inch, 16.3 g) was allowed to freely fall from the height (a) of 500 mm, the maximum height (b) of the rebounded ball was read, and the rebound resilience (%) was calculated according to the formula: (b)/(a)×100. The measurement was performed three times for each specimen and the average was regarded as the rebound resilience.

<C Hardness of Expanded Molded Article>

The C hardness was measured for a sample of 50×50×thickness 20 mm which was conditioned in an environment of a temperature of 23±2° C. and a humidity of 50±5% for 72 hours or more on a durometer (Asker rubber plastic hardness tester type C, manufactured by Kobunshi Keiki Co., Ltd.). The pressurizing plane was closely attached so that the indenter is perpendicular to the measurement plane of the specimen, and the scale was immediately read. The sample was measured at 5 points except for the fused plane of expanded particles and the average was obtained as the C hardness.

<Compression Set of Expanded Molded Article>

The compression set was measured according to JIS K6767:1999 "Cellular plastics-Polyethylene-Methods of test". The thickness was measured according to JIS K6250: 2006, method A of dimension measurement at 10 kPa. While leaving a skin layer on a plane perpendicular to the thickness direction, an expanded molded article was cut to 50×50×thickness 20 mm, conditioned in a standard atmosphere according to JIS K 7100:1999, symbol "23/50" (temperature 23° C., relative humidity 50%), class 2 for 16 hours followed by measurement in the same standard atmosphere. The specimen was measured for the thickness A (mm) to two places of decimals. Next, the specimen was compressed to set by 25% of the thickness of the specimen on a compression set tester (type FCS-1, manufactured by Kobunshi Keiki Co., Ltd.), left for 22 hours, detached from the compression set tester, and the thickness B (mm) after 30 minutes from the end of compression was measured to two places of decimals. The compression set (%) was calculated according to the following equation. The measurement was performed three times for a specimen and the average was regarded as the compression set (%).

Compression set (%)=$(A-B)/A$×100

<Compression Stress of Expanded Molded Article>

The compression stress was measured according to the method in JIS K6767:1999 "Cellular plastics-Polyethylene-Methods of test". Namely, with a tensilon universal tester (UCT-10T, manufactured by ORIENTEC Co., Ltd.) and a universal tester data processing software (UTPS-458X, manufactured by SOFTBRAIN Co., Ltd.), the size of a specimen was 50×50×thickness 20 mm (an article was cut with a bread slicer while leaving a skin layer on a plane perpendicular to the thickness direction) and the compression rate was 10 mm/min (the traveling speed per minute was as close as possible to 50% of the thickness of the specimen). The point at the intersection of the linear part and the displacement axis, of compression modulus, was determined, and the compression stress (kPa) when compressed by 25% of the thickness and by 50% of the thickness was measured. Three specimens were conditioned in a standard atmosphere according to JIS K 7100:1999, symbol "23/50" (temperature 23° C., relative humidity 50%), class 2 for 16 hours followed by measurement in the same standard atmosphere.

The 25% compression stress $\sigma_{25}$ was calculated according to the following equation:

$\sigma_{25}=10^3 \times F_{25}/A_0$ $\sigma_{25}$: compression stress (kPa)
$F_{25}$: load (N) at 25% deformation
$A_0$: initial sectional area (mm²) of the specimen The 50% compression stress $\sigma_{50}$ was calculated according to the following equation:

$\sigma_{50}=10^3 \times F_{50}/A_0$ $\sigma_{50}$: compression stress (kPa)
$F_{50}$: load (N) at 25% deformation
$A_0$: initial sectional area (mm$^2$) of the specimen <Fusion Rate of Expanded Molded Article>

On the surface of an expanded molded article (400×300×thickness 20 mm), a score with a depth of about 5 mm was made with a cutter knife along the line connecting the centers of a pair of longer sides, and then the expanded molded article was divided into two along the score. For expanded particles at the ruptured planes of the halved expanded molded articles, an arbitrary region including 100 expanded particles was established, the number (a) of expanded particles ruptured within the expanded particles and the number (b) of expanded particles ruptured at the interfaces between expanded particles were counted in the region and the fusion rate F (%) was calculated according to the following equation:

$$F(\%) = a/(a+b) \times 100$$

<Immersed Gas (Butane Gas, Carbon Dioxide Gas) Amount in Expandable Particles>

Obtained expandable particles were immediately measured for the mass W1 (g) and left in an environment of a temperature of 23±2° C. and a humidity of 50±5% for 24 hours. After the period, the expandable particles were measured for the mass W2 (g), and the immersed gas amount was calculated according to the following equation:

Immersed gas amount (% by mass) of expandable particles=(W1−W2)/W1×100

<Immersed Gas (Nitrogen Gas) Amount of Expanded Particles>

Expanded particles before application of internal pressure were measured for the mass W1 (g). Next, expanded particles after application of internal pressure containing nitrogen gas were measured for the mass W2 (g). The immersed gas amount of the expanded particles was calculated according to the following equation:

Immersed gas amount (% by mass) of expanded particles=(W2−W1)/W2×100

Example 1

(1) Expandable Particles

To a 5-L autoclave with a stirrer, 2 kg (100 parts by mass) of ester-based elastomer (product name: "PELPRENE GP-400", manufactured by Toyobo Co., Ltd., hard segment: polybutylene terephthalate, soft segment: aliphatic polyether) resin particles, 2.5 L of distilled water, 0.13 parts by mass of surfactant (sodium linear alkylbenzene sulfonate, product name: "Newrex R", manufactured by Yuka Sangyo Co., Ltd.) and 0.5 parts by mass of organic cell regulator (ethylene bis stearamide, product name: "Kao Wax EBFF", manufactured by Kao Corporation) were added and the autoclave was then sealed followed by injection of 12 parts by mass of blowing agent, butane (normal butane:isobutane=7:3), together with nitrogen gas while stirring. The autoclave was then heated at 100° C. for 3 hours and then cooled to 25° C. After completion of cooling, the autoclave was depressurized, the surfactant and an excess cell regulator were immediately washed off with distilled water and dehydrated to obtain expandable particles. The expandable particles had an immersed gas amount of 8.5% by mass.

(2) Expanded Particles

A coalescence inhibitor (0.25 parts by mass, polyoxyethylene polyoxypropylene glycol, product name: "EPAN 450", manufactured by DKS Co., Ltd.) was applied to 1.5 kg (100 parts by mass) of expandable particles which were then placed in a 50-L circular cylindrical pre-expansion machine equipped with a stirrer, heated with water vapor of 0.21 MPa gauge pressure while stirring to obtain expanded particles.

(3) Expanded Molded Article

The expanded particles were placed into an autoclave, nitrogen gas of 1.2 MPa gauge pressure was injected and left at 30° C. for 18 hours to immerse the expanded particles with nitrogen gas (internal pressure application). The immersed nitrogen amount was 2.6% by mass.

The expanded particles were taken out from the autoclave, immediately packed into a molding cavity of a size of 400 mm×300 mm×thickness 20 mm having pores for water vapor and subjected to heat molding with water vapor of 0.27 MPa gauge pressure, thereby obtaining an expanded molded article.

A sectional image of the obtained expanded molded article is shown in FIG. 1.

Example 2

(1) Expandable Particles

Expandable particles were prepared in the same manner as in Example 1 except that the base resin was changed to an ester-based elastomer (product name: "PELPRENE GP-475", manufactured by Toyobo Co., Ltd., hard segment: polybutylene terephthalate and polybutylene isophthalate, soft segment: aliphatic polyether). The expandable particles had an immersed gas amount of 4.8% by mass.

(2) Expanded Particles

Expanded particles were prepared in the same manner as in Example 1 except that heating was carried out with water vapor of 0.20 MPa gauge pressure.

(3) Expanded Molded Article

An expanded molded article was prepared in the same manner as in Example 1 except that heat molding was carried out with water vapor of 0.18 MPa gauge pressure. The expanded particles had an immersed nitrogen amount of 3.5% by mass.

Figure 2:
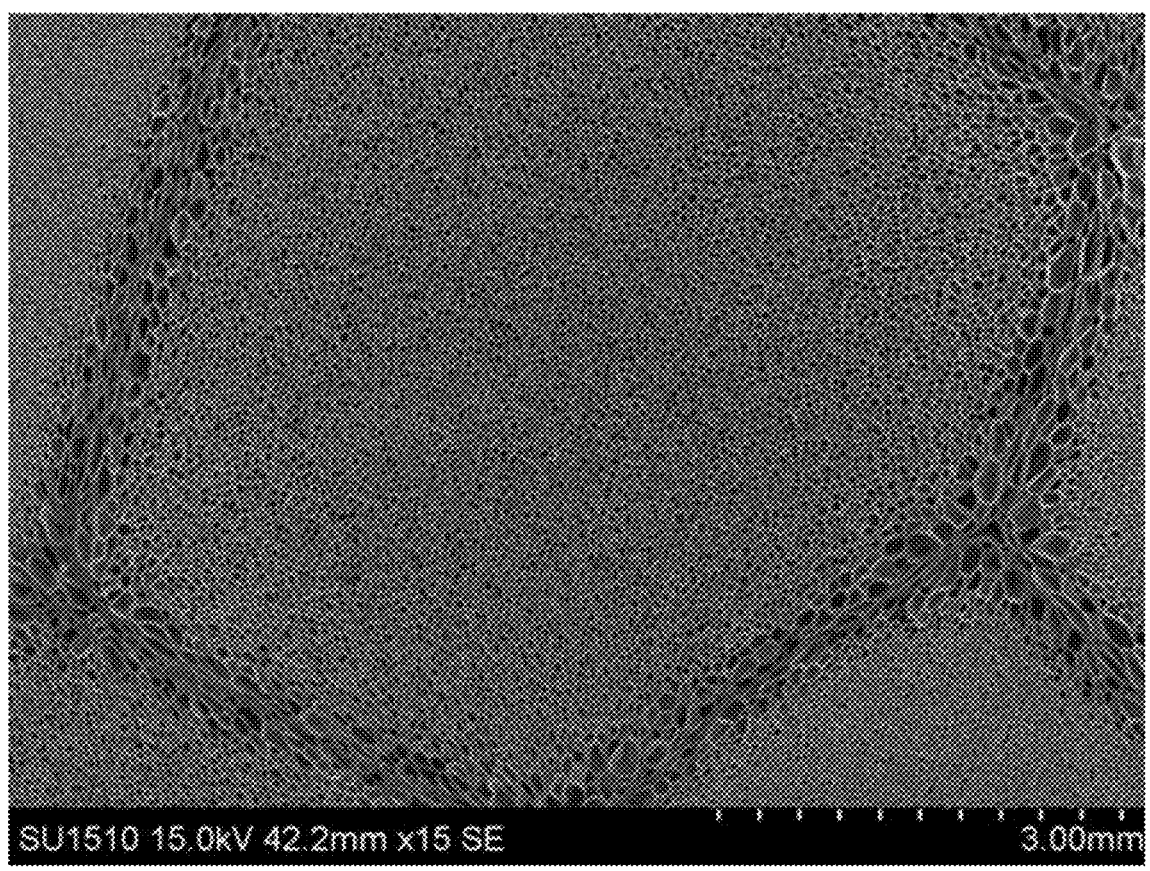
FIG. 2 is a sectional image of the expanded molded article of Example 2.

A sectional image of the obtained expanded molded article is shown in FIG. 2.

Example 3

(1) Expandable Particles

Expandable particles were prepared in the same manner as in Example 1 except that the base resin was changed to an ester-based elastomer (product name: "VYLON GM-913", manufactured by Toyobo Co., Ltd., hard segment: polybutylene terephthalate and polybutylene isophthalate, soft segment: aliphatic polyether). The expandable particles had an immersed gas amount of 8.8% by mass.

(2) Expanded Particles

Expanded particles were prepared in the same manner as in Example 1 except that heating was carried out with water vapor of 0.06 MPa gauge pressure.

(3) Expanded Molded Article

An expanded molded article was prepared in the same manner as in Example 1 except that heat molding was carried out with water vapor of 0.06 MPa gauge pressure. The expanded particles had an immersed nitrogen amount of 1.7% by mass.

Figure 3:
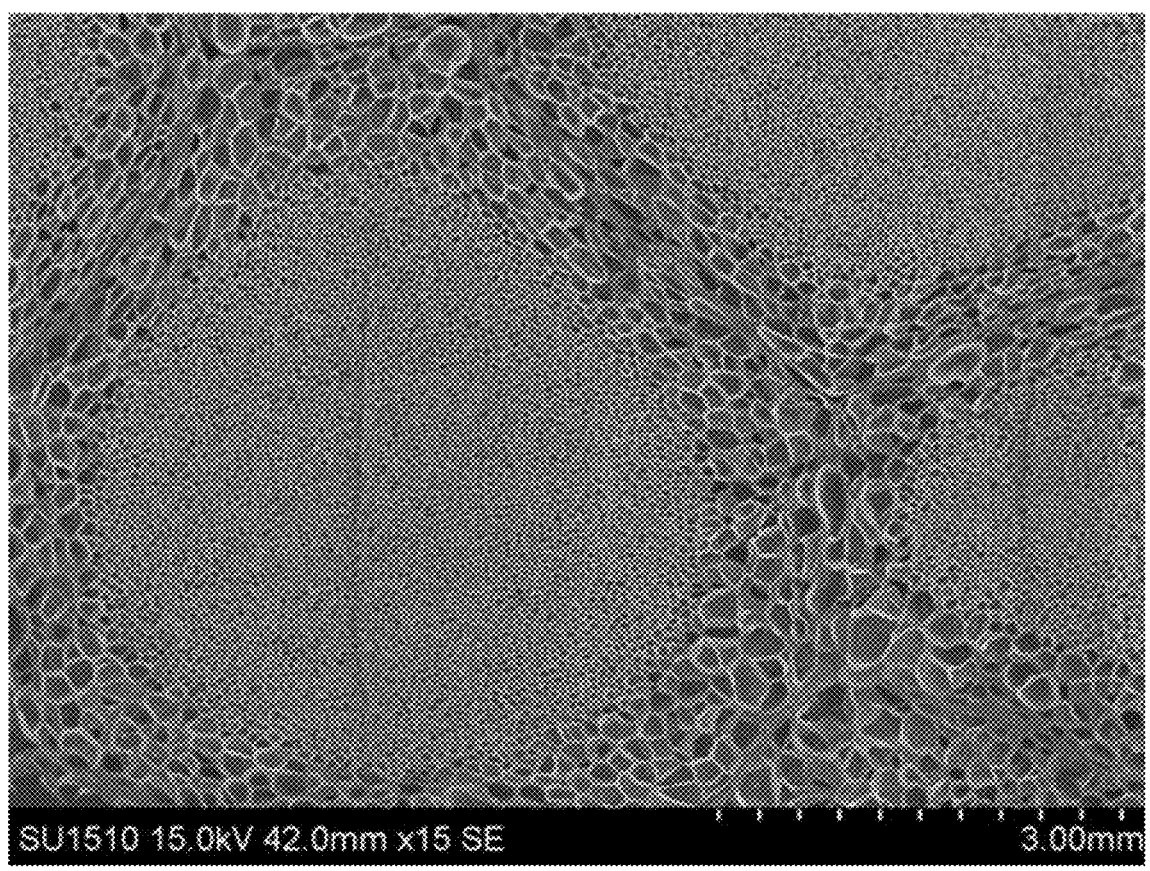
FIG. 3 is a sectional image of the expanded molded article of Example 3.

A sectional image of the obtained expanded molded article is shown in FIG. 3.

Example 4

(1) Expandable Particles

Expandable particles were prepared in the same manner as in Example 1 except that the base resin was changed to an ester-based elastomer (product name: "VYLON GM-915", manufactured by Toyobo Co., Ltd., hard segment: polybutylene terephthalate and polybutylene isophthalate, soft segment: aliphatic polyether). The expandable particles had an immersed gas amount of 6.1% by mass.

(2) Expanded Particles

Expanded particles were prepared in the same manner as in Example 1 except that heating was carried out with water vapor of 0.06 MPa gauge pressure.

(3) Expanded Molded Article

An expanded molded article was prepared in the same manner as in Example 1 except that heat molding was carried out with water vapor of 0.1 MPa gauge pressure. The expanded particles had an immersed nitrogen amount of 1.0% by mass.

Figure 4:
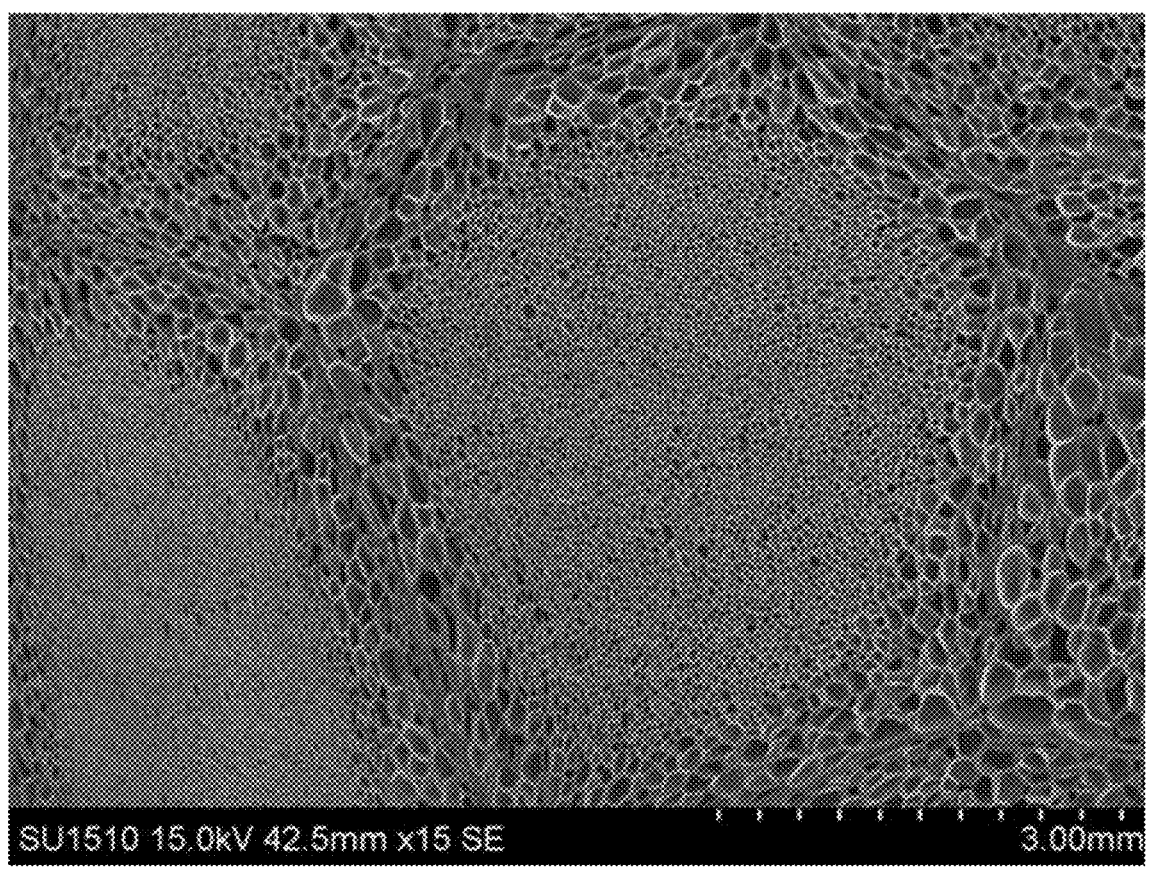
FIG. 4 is a sectional image of the expanded molded article of Example 4.

A sectional image of the obtained expanded molded article is shown in FIG. 4.

Example 5

(1) Expandable Particles

Expandable particles were prepared in the same manner as in Example 1 except that the base resin was changed to an ester-based elastomer (product name: "PELPRENE P-55B", manufactured by Toyobo Co., Ltd., hard segment: polybutylene terephthalate, soft segment: aliphatic polyether). The expandable particles had an immersed gas amount of 7.8% by mass.

(2) Expanded Particles

Expanded particles were prepared in the same manner as in Example 1 except that heating was carried out with water vapor of 0.35 MPa gauge pressure.

(3) Expanded Molded Article

An expanded molded article was prepared in the same manner as in Example 1 except that heat molding was carried out with water vapor of 0.4 MPa gauge pressure. The expanded particles had an immersed nitrogen amount of 1.0% by mass.

Figure 5:
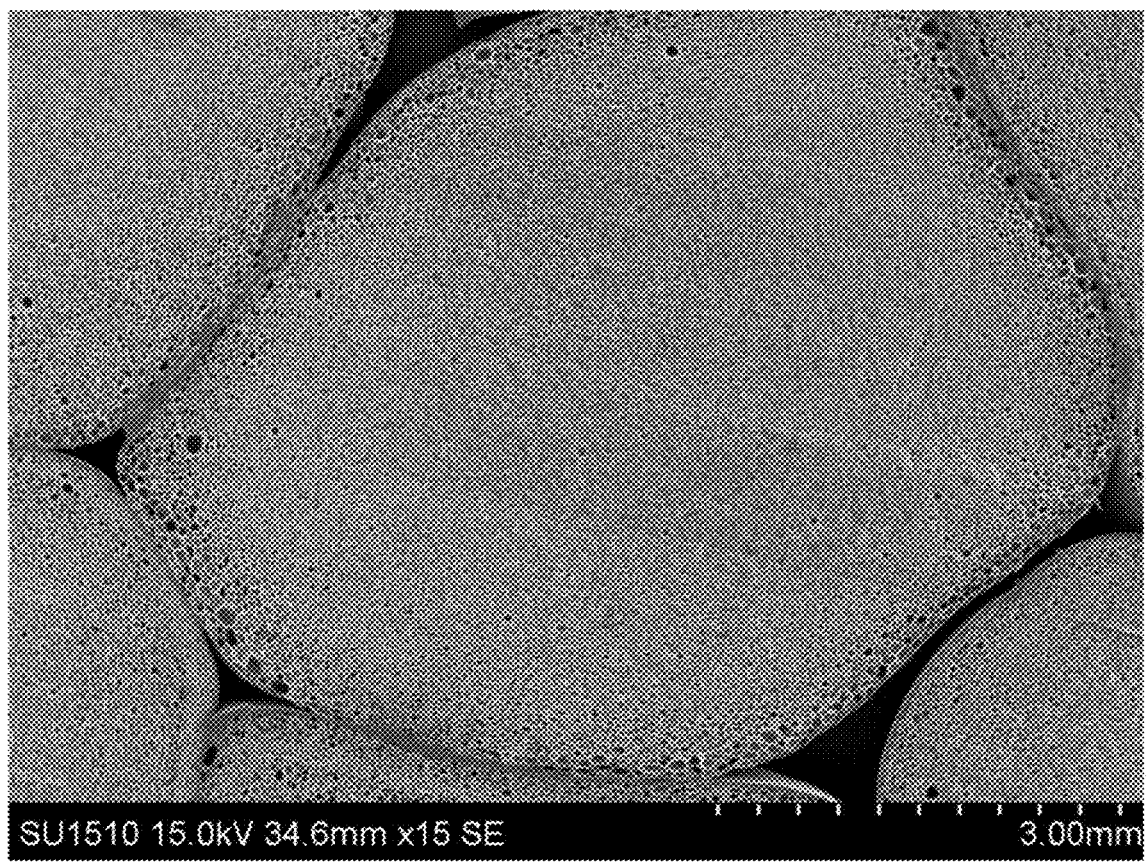
FIG. 5 is a sectional image of the expanded molded article of Example 5.

A sectional image of the obtained expanded molded article is shown in FIG. 5.

Example 6

(1) Expandable Particles

Expandable particles were prepared in the same manner as in Example 1 except that the base resin was changed to an ester-based elastomer (product name: "PELPRENE GP-600", manufactured by Toyobo Co., Ltd., hard segment: polybutylene terephthalate and polybutylene isophthalate, soft segment: aliphatic polyether). The expandable particles had an immersed gas amount of 5.5% by mass.

(2) Expanded Particles

Expanded particles were prepared in the same manner as in Example 1 except that heating was carried out with water vapor of 0.28 MPa gauge pressure.

(3) Expanded Molded Article

An expanded molded article was prepared in the same manner as in Example 1 except that heat molding was carried out with water vapor of 0.40 MPa gauge pressure. The expanded particles had an immersed nitrogen amount of 1.3% by mass.

Figure 6:
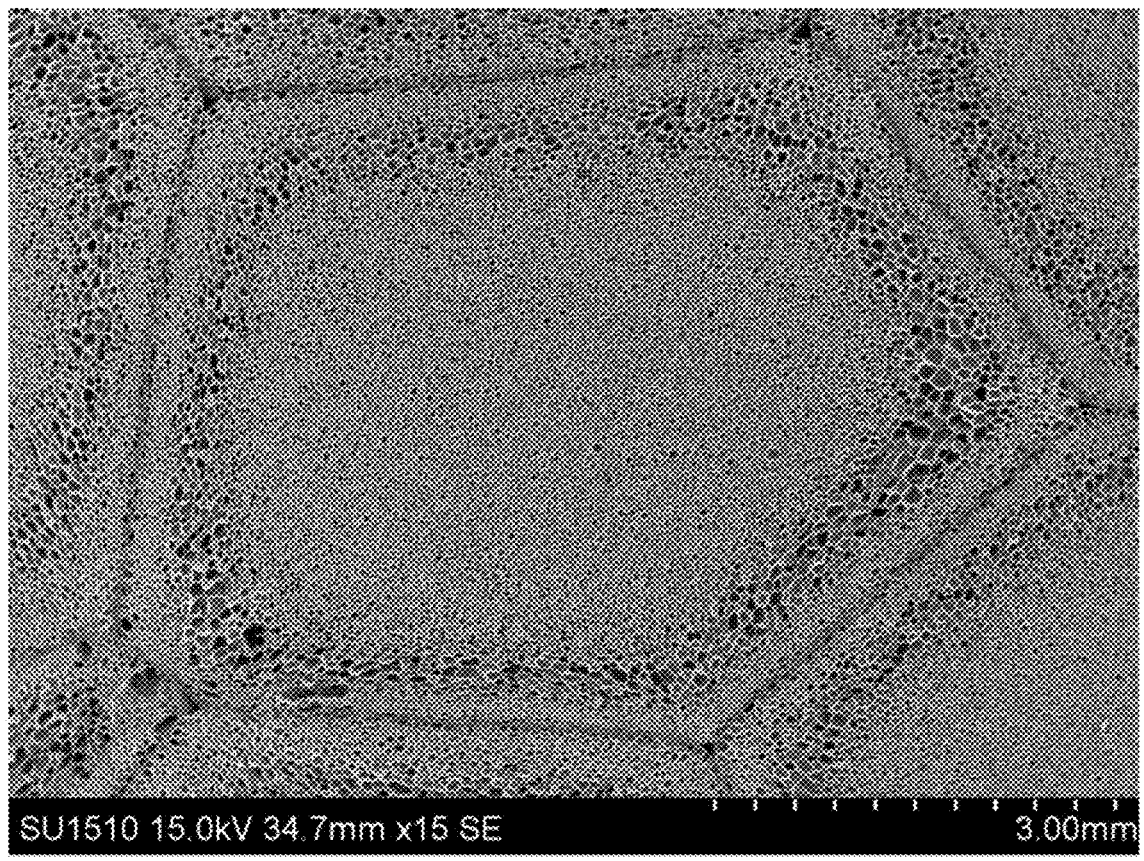
FIG. 6 is a sectional image of the expanded molded article of Example 6.

A sectional image of the obtained expanded molded article is shown in FIG. 6.

Example 7

(1) Expandable Particles

To a 5-L autoclave, 2 kg of ester-based elastomer (product name: "PELPRENE GP-475", manufactured by Toyobo Co., Ltd., hard segment: polybutylene terephthalate and polybutylene isophthalate, soft segment: aliphatic polyether) resin particles were added and the autoclave was sealed followed by application of pressure with carbon dioxide (blowing agent) from atmospheric pressure to gauge pressure of 4 MPa. The autoclave was then left at 23° C. for 24 hours and then depressurized to obtain expandable particles. The expandable particles had an immersed gas amount of 7.0% by mass.

(2) Expanded Particles

Expanded particles were prepared in the same manner as in Example 1 except that heating was carried out with water vapor of 0.11 MPa gauge pressure.

(3) Expanded Molded Article

An expanded molded article was prepared in the same manner as in Example 1 except that heat molding was carried out with water vapor of 0.21 MPa gauge pressure. The expanded particles had an immersed nitrogen amount of 0.3% by mass.

Figure 7:
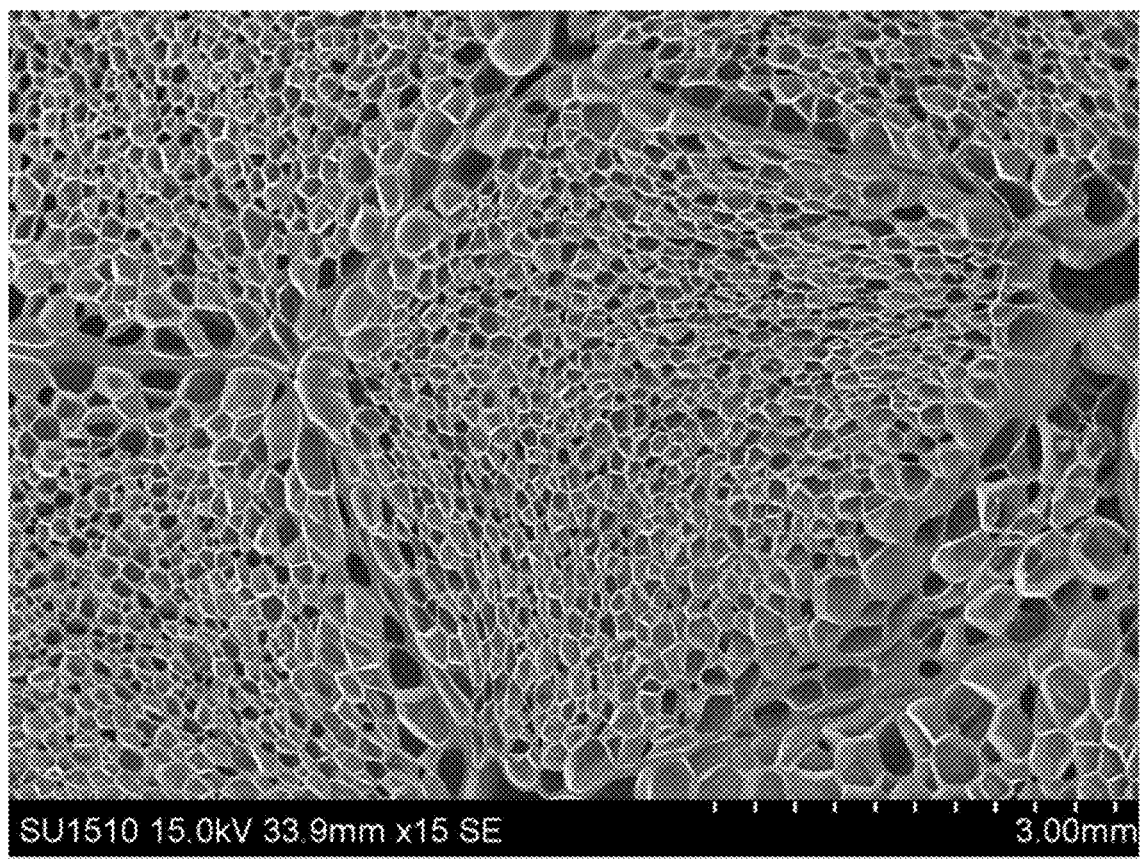
FIG. 7 is a sectional image of the expanded molded article of Example 7.

A sectional image of the obtained expanded molded article is shown in FIG. 7.

Example 8

(1) Resin Particles

An ester-based elastomer (100 parts by mass, product name: "PELPRENE GP-475", manufactured by Toyobo Co., Ltd., hard segment: polybutylene terephthalate and polybutylene isophthalate, soft segment: aliphatic polyether) and 0.3 parts by mass of organic cell regulator (ethylene bis stearamide, product name: "Kao Wax EBFF", manufactured by Kao Corporation) were fed to a uniaxial extruder and melt-kneaded at 180 to 280° C. The molten ester-based elastomer was then cooled to adjust the viscosity and extruded through each nozzle of a multiple-nozzle metal die (having 8 nozzles with a diameter of 1.3 mm) attached on the front edge of the uniaxial extruder and then cut in water of 30 to 50° C. The obtained resin particles had a particle length L of 1.4 to 1.8 mm and a particle average diameter D of 1.4 to 1.8 mm.

(2) Expandable Particles

To a 5-L autoclave equipped with a stirrer, 1.5 kg (100 parts by mass) of resin particles, 3 L of distilled water and 4 g of surfactant (sodium linear alkylbenzene sulfonate, product name: "Newrex R", manufactured by Yuka Sangyo Co., Ltd.) were added and the autoclave was sealed followed by injection of 16 parts by mass of blowing agent, butane (normal butane:isobutane=7:3), while stirring. The autoclave was then heated at 100° C. for 2 hours and then cooled to 25° C. After completion of cooling, the autoclave was depressurized, the surfactant was washed off with distilled water and dehydrated to obtain expandable particles. The expandable particles had an immersed gas amount of 7.9% by mass.

(3) Expanded Particles

A coalescence inhibitor (0.25 parts by mass, polyoxyethylene polyoxypropylene glycol, product name: "EPAN 450", manufactured by DKS Co., Ltd.) was applied to 1.5 kg (100 parts by mass) of the expandable particles which were then placed in a 50-L circular cylindrical pre-expansion machine equipped with a stirrer, heated with water vapor of 0.11 MPa gauge pressure while stirring to obtain expanded particles.

(4) Expanded Molded Article

The expanded particles were placed into an autoclave, nitrogen gas of 0.5 MPa gauge pressure was injected and left at 30° C. for 18 hours to immerse the expanded particles with nitrogen gas (internal pressure application). The immersed nitrogen gas amount was 1.1% by mass.

The expanded particles were taken out from the autoclave, immediately packed into a molding cavity of a size of 400 mm×300 mm×thickness 20 mm having pores for water vapor and subjected to heat molding with water vapor of 0.21 MPa gauge pressure, thereby obtaining an expanded article.

Figure 8:
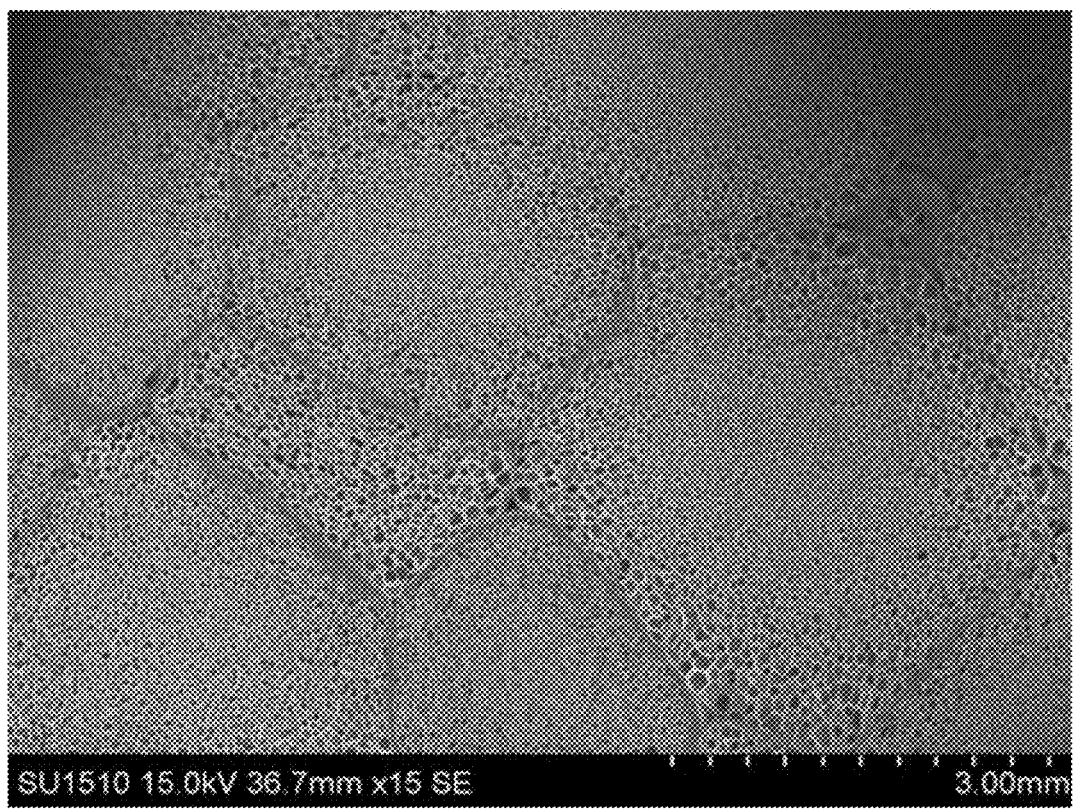
FIG. 8 is a sectional image of the expanded molded article of Example 8.

A sectional image of the obtained expanded molded article is shown in FIG. 8.

Example 9

(1) Resin Particles

Resin particles were prepared in the same manner as in Example 8 except that the base resin was changed to an ester-based elastomer (product name: "PELPRENE GP-600", manufactured by Toyobo Co., Ltd., hard segment: polybutylene terephthalate and polybutylene isophthalate, soft segment: aliphatic polyether). The obtained resin particles had a particle length L of 1.4 to 1.8 mm and a particle average diameter D of 1.4 to 1.8 mm.

(2) Expandable Particles

Expandable particles were prepared in the same manner as in Example 8. The expandable particles had an immersed gas amount of 7.6% by mass.

(3) Expanded Particles

Expanded particles were prepared in the same manner as in Example 8 except that heating was carried out with water vapor of 0.26 MPa gauge pressure.

(4) Expanded Molded Article

An expanded molded article was prepared in the same manner as in Example 8 except that heat molding was carried out with water vapor of 0.40 MPa gauge pressure. The expanded particles had an immersed nitrogen amount of 1.6% by mass.

Figure 9:
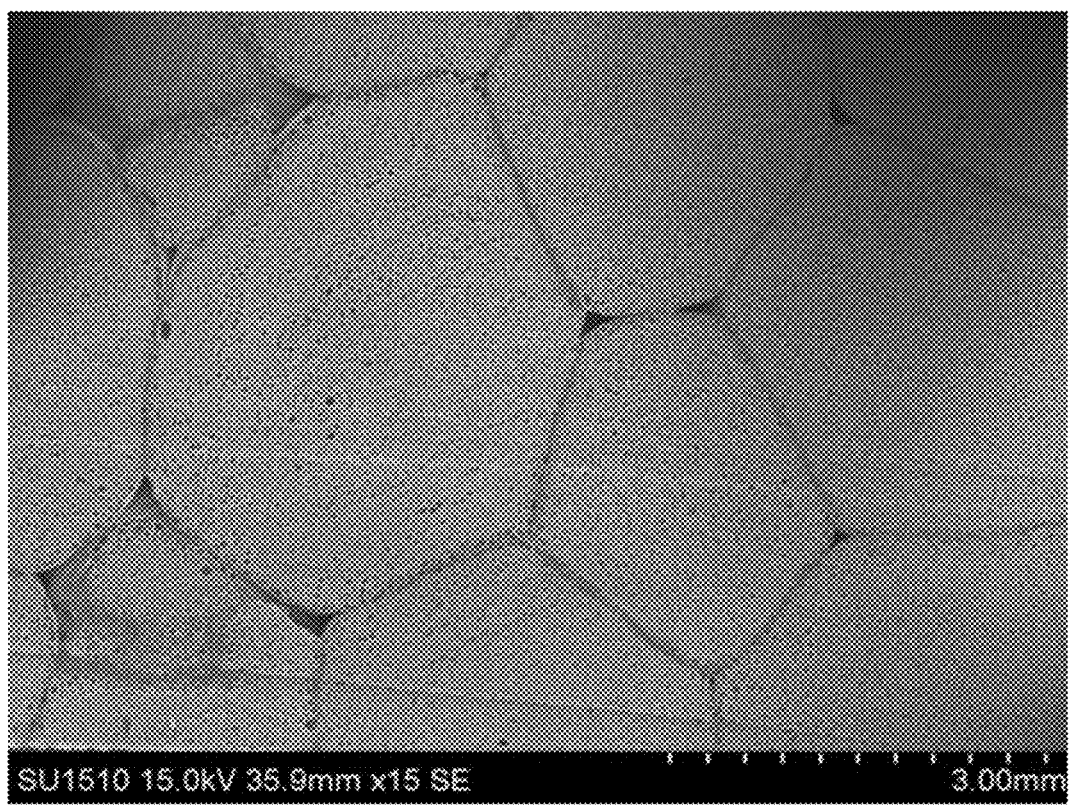
FIG. 9 is a sectional image of the expanded molded article of Example 9.

A sectional image of the obtained expanded molded article is shown in FIG. 9.

Example 10

(1) Resin Particles

Resin particles were prepared in the same manner as in Example 8 except that the diameter of the multiple-nozzle metal die of the extruder was changed from 1.3 mm to 1.0 mm. The obtained resin particles had a particle length L of 1.1 to 1.5 mm and a particle average diameter D of 1.1 to 1.5 mm.

(2) Expandable Particles

To a 43-L heat sealable pressure resistant rotary mixer, 15 kg (100 parts by mass) of resin particles, 0.25 parts by mass of coalescence inhibitor (polyoxyethylene polyoxypropylene glycol, product name: "EPAN 450", manufactured by DKS Co., Ltd.) and 0.3 parts by mass of distilled water were added and the mixer was sealed to which 16 parts by mass of blowing agent, butane (normal butane:isobutane-7:3), was injected while rotating. The mixer was then heated at 85° C. for 2 hours while rotating, cooled to 25° C. and depressurized to obtain expandable particles. The expandable particles had an immersed gas amount of 5.9% by mass.

(3) Expanded Particles

Expandable particles (1.5 kg) were placed in a 50-L circular cylindrical pre-expansion machine equipped with a stirrer, heated with water vapor of 0.12 MPa gauge pressure while stirring to obtain expanded particles.

(4) Expanded Molded Article

The expanded particles were placed into an autoclave, nitrogen gas of 0.5 MPa gauge pressure was injected and left at 30° C. for 18 hours to immerse the expanded particles with nitrogen gas (internal pressure application). The immersed nitrogen gas amount was 0.7% by mass.

The expanded particles were taken out from the autoclave, immediately packed into a molding cavity of a size of 400 mm×300 mm×thickness 20 mm having pores for water vapor and subjected to heat molding with water vapor of 0.22 MPa gauge pressure, thereby obtaining an expanded article.

Figure 10:
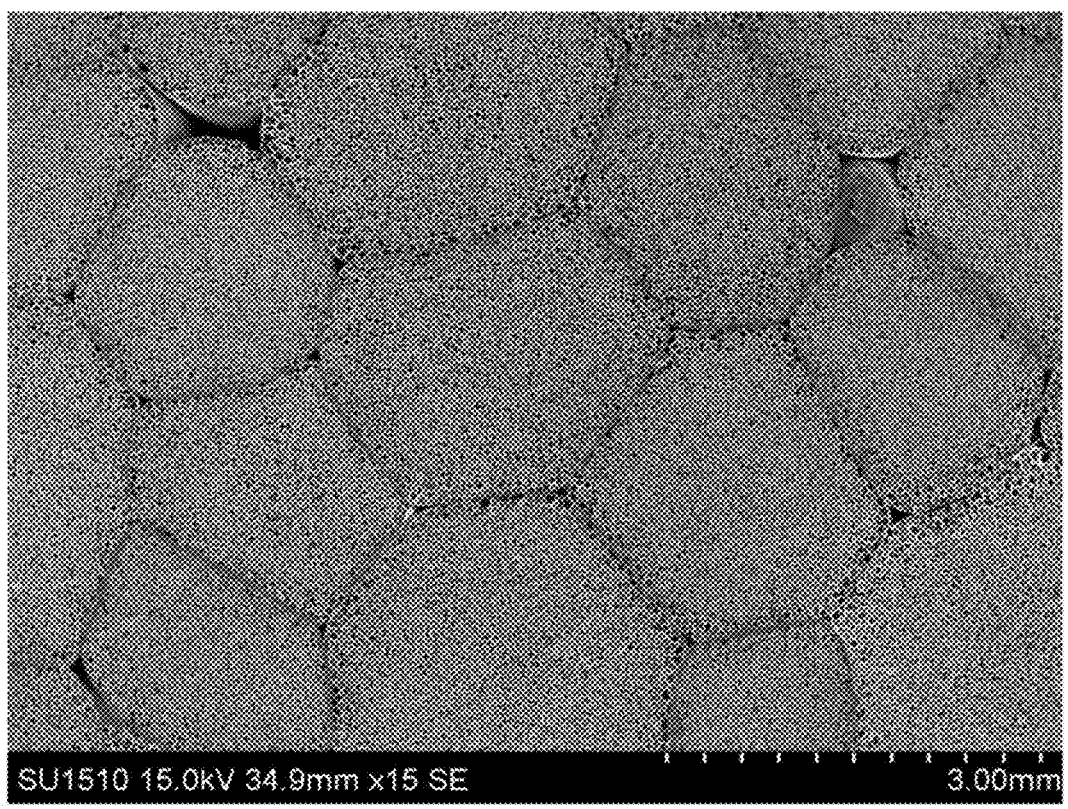
FIG. 10 is a sectional image of the expanded molded article of Example 10.

A sectional image of the obtained expanded molded article is shown in FIG. 10.

Example 11

(1) Resin Particles

Resin particles were prepared in the same manner as in Example 10. The obtained resin particles had a particle length L of 1.1 to 1.5 mm and a particle average diameter D of 1.1 to 1.5 mm.

(2) Expandable Particles

Expandable particles were prepared in the same manner as in Example 10. The expandable particles had an immersed gas amount of 5.8% by mass.

(3) Expanded Particles

Expanded particles were prepared in the same manner as in Example 10 except that heating was carried out with water vapor of 0.13 MPa gauge pressure.

(4) Expanded Molded Article

An expanded molded article was prepared in the same manner as in Example 10 except that heat molding was carried out with water vapor of 0.21 MPa gauge pressure. The expanded particles had an immersed nitrogen amount of 1.0% by mass.

Figure 11:
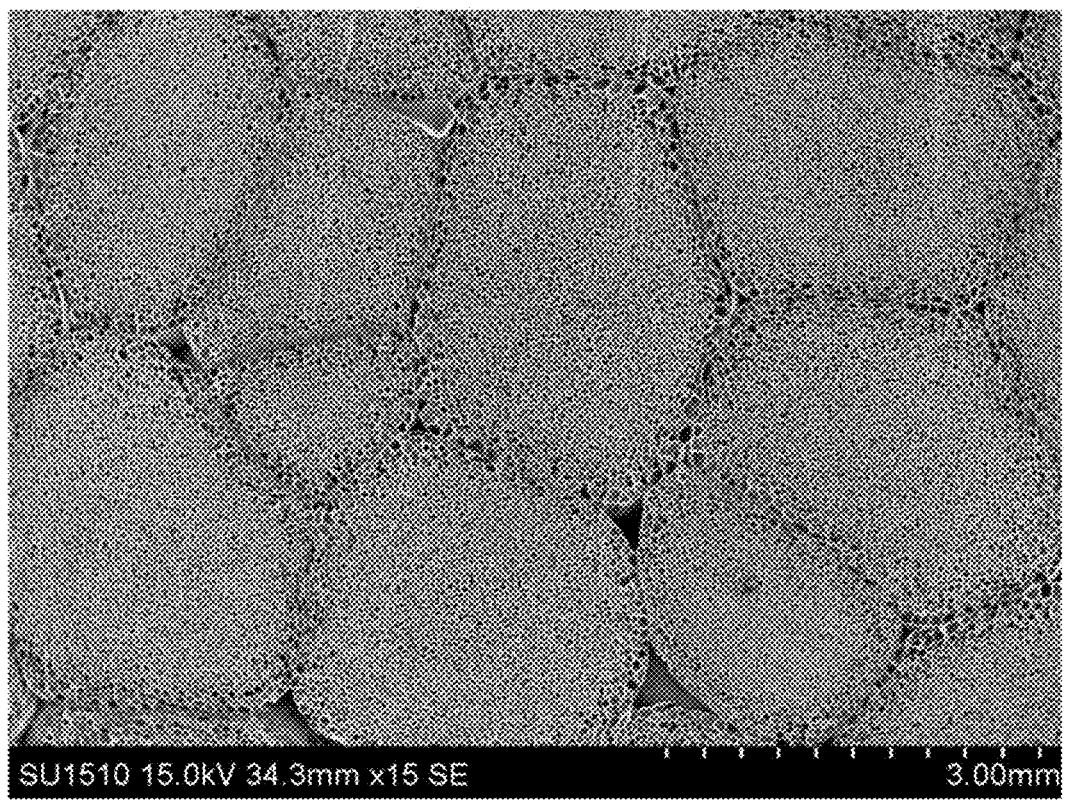
FIG. 11 is a sectional image of the expanded molded article of Example 11.

A sectional image of the obtained expanded molded article is shown in FIG. 11.

Comparative Example 1

A polyurethane expanded molded article in the midsole portion of a sports shoe (product name: "Energy Boost", manufactured by Adidas) was cut out and variously evaluated.

Figure 12:
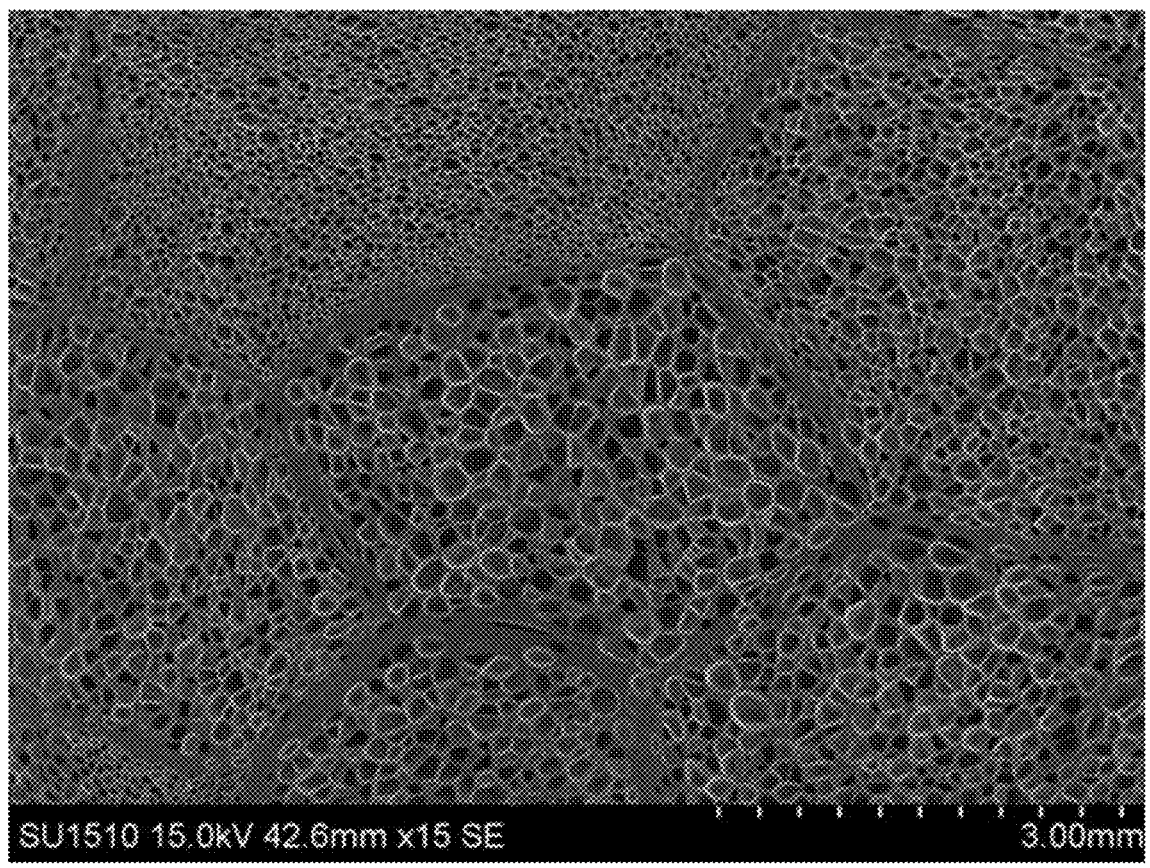
FIG. 12 is a sectional image of the expanded molded article of Comparative Example 1.

A sectional image of the cut-out expanded molded article is shown in FIG. 12.

Comparative Example 2

(1) Expanded Particles

A polyethylene terephthalate composition comprising 100 parts by mass of polyethylene terephthalate (product name: "SA-135", manufactured by Mitsui Chemicals, Inc.), 1.8 parts by mass of master batch that contained polyethylene terephthalate and talc (polyethylene terephthalate content: 60% by mass, talc content: 40% by mass, intrinsic viscosity of polyethylene terephthalate: 0.88) and 0.20 parts by mass of pyromellitic anhydride was fed to a uniaxial extruder having an aperture of 65 mm and an L/D ratio of 35 and melt-kneaded at 290° C.

Thereafter, butane consisting of 30% by mass of isobutane and 70% by mass of normal butane was injected from the middle of the extruder to the molten polyethylene terephthalate composition at 0.7 parts by mass relative to 100 parts by mass of polyethylene terephthalate, thereby uniformly dispersing butane in polyethylene terephthalate. Thereafter, the molten polyethylene terephthalate composition was cooled to 280° C. at the front edge part of the extruder and then the polyethylene terephthalate composition was extruded/expanded through each nozzle of the multiple-nozzle metal die attached on the front edge of the extruder. The extrusion amount of the polyethylene terephthalate composition was 30 kg/h.

The multiple-nozzle metal die had 20 nozzles each having a diameter at the outlet of 1 mm, and all outlets of the nozzles were provided at regular intervals on a virtual circle having a diameter of 139.5 mm assumed to be on the front edge plane of the multiple-nozzle metal die. On the outer circumference plane of the back edge part of the axis of rotation, two rotating blades were integrally provided with a phase difference of 180° in the circumference direction of the axis of rotation, and each rotating blade was formed so that the blade moved on the virtual circle while always contacting the front edge plane of the multiple-nozzle metal die. Further, a cooling unit comprised a cooling drum having a front circular front part and a cylindrical peripheral wall part having an inner diameter of 320 mm extending backwards from the outer periphery of the front part. Cooling water of 20° C. was fed to the cooling drum through a feeding pipe and a feeding port of the cooling drum. The cooling drum had a capacity of 17684 cm$^3$. Cooling water moved forward in a spiral manner along the inner peripheral plane of the peripheral wall part of the cooling drum by centrifugal force generated along with the flow generated when cooling water was fed from the feeding pipe to the inner peripheral plane of the peripheral wall part of the cooling drum. Cooling liquid gradually spread in the direction perpendicular to the direction of movement while moving along the inner peripheral plane of the peripheral wall part, and as a result, the inner peripheral plane of the peripheral wall part beyond the feeding port of the cooling drum was covered throughout with cooling liquid.

While rotating the rotating blades provided on the front edge plane of the multiple-nozzle metal die at a rotation speed of 2500 rpm, the polyethylene terephthalate extruded/expanded through outlets of the nozzles of the multiple-nozzle metal die was cut with the rotating blades, thereby producing approximately spherical cut particles. The extruded polyethylene terephthalate contained a non-expanded part immediately after extrusion from the nozzles of the multiple-nozzle metal die and an expanding part which is in the middle of expanding and successive to the non-expanded part. The extruded polyethylene terephthalate was cut at the opening edge of the outlet of the nozzle and the extruded polyethylene terephthalate was cut in the non-expanded part.

For production of the polyethylene terephthalate expanded particles for expansion molding in a die, the multiple-nozzle metal die was preliminarily used without the axis of rotation, and the cooling unit was separated from the multiple-nozzle metal die. By extruding/expanding an extruded polyethylene terephthalate from such an extruder, it was observed that the extruded polyethylene terephthalate contained a non-expanded part immediately after extrusion from the nozzles of the multiple-nozzle metal die and an expanding part successive to the non-expanded part.

Next, the axis of rotation was attached to the multiple-nozzle metal die and the cooling unit was provided at a predetermined position, and then the axis of rotation was rotated, the extruded polyethylene terephthalate was cut with the rotating blades at the opening edges of the outlets of the nozzles, thereby producing cut particles. The cut particles were blown outwards or forwards by the cutting stress of the rotating blades, collided with the cooling water flowing along the inner surface of the cooling drum of the cooling unit so as to follow the cooling water from the upstream side to the downstream side of the cooling water flow from the oblique direction relative to the surface of the cooling water, entered into the cooling water and immediately cooled, thereby producing expanded particles. The obtained expanded particles were discharged with the cooling water through an outlet of the cooling drum and then separated from the cooling water in a dehydrator.

(2) Expanded Molded Article

A molding cavity of a size of 400 mm×300 mm×thickness 20 mm having pores for water vapor was filled with the expanded particles, heat molding was carried out with water vapor of 0.13 MPa gauge pressure, thereby obtaining an expanded molded article.

Figure 13:
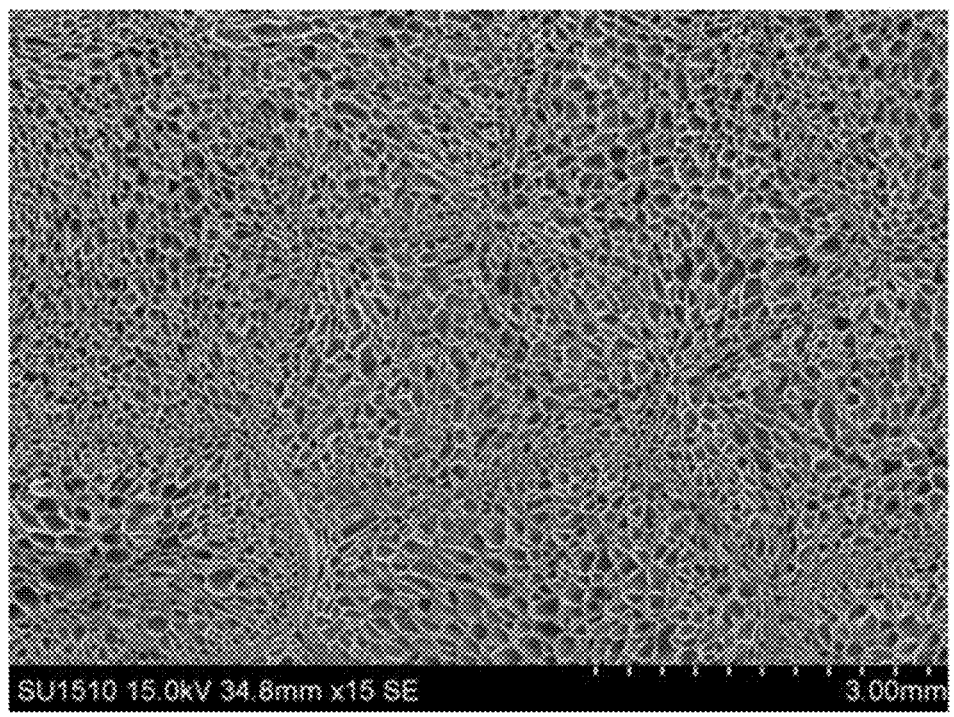
FIG. 13 is a sectional image of the expanded molded article of Comparative Example 2.
Figure 14:
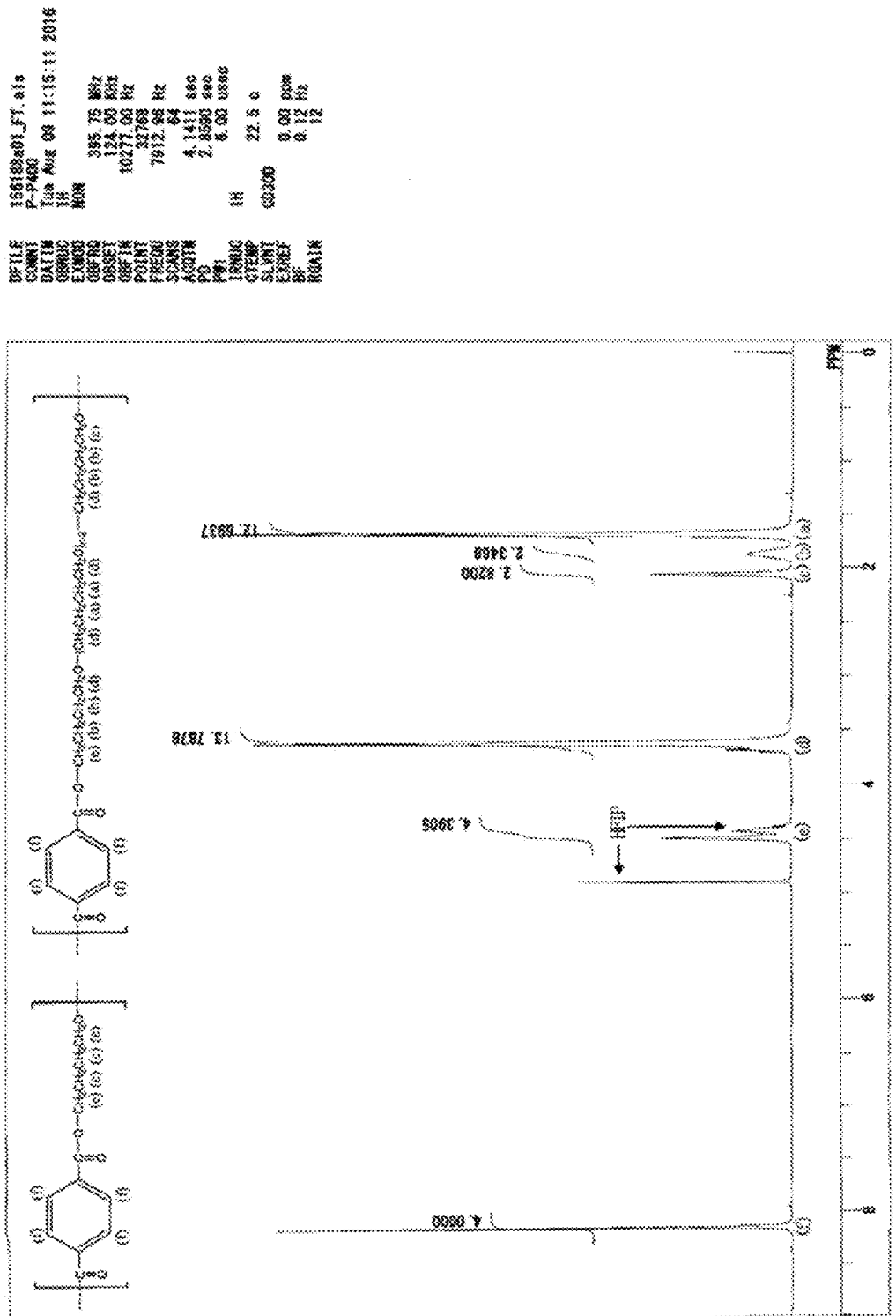
FIG. 14 is a $^1$H-NMR spectrum of the ester-based elastomer used in Example 1.
Figure 15:
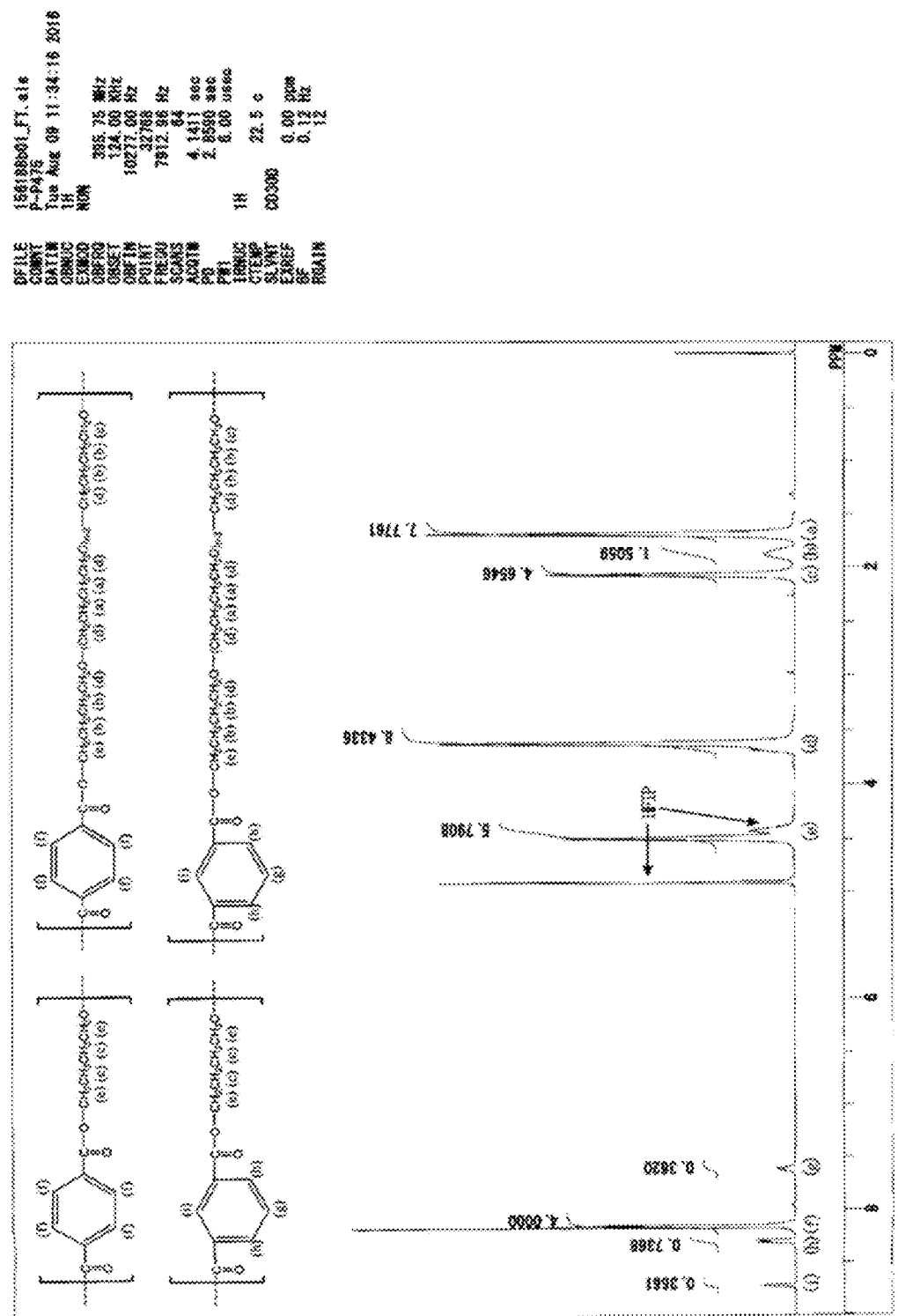
FIG. 15 is a $^1$H-NMR spectrum of the ester-based elastomer used in Example 2.
Figure 16:
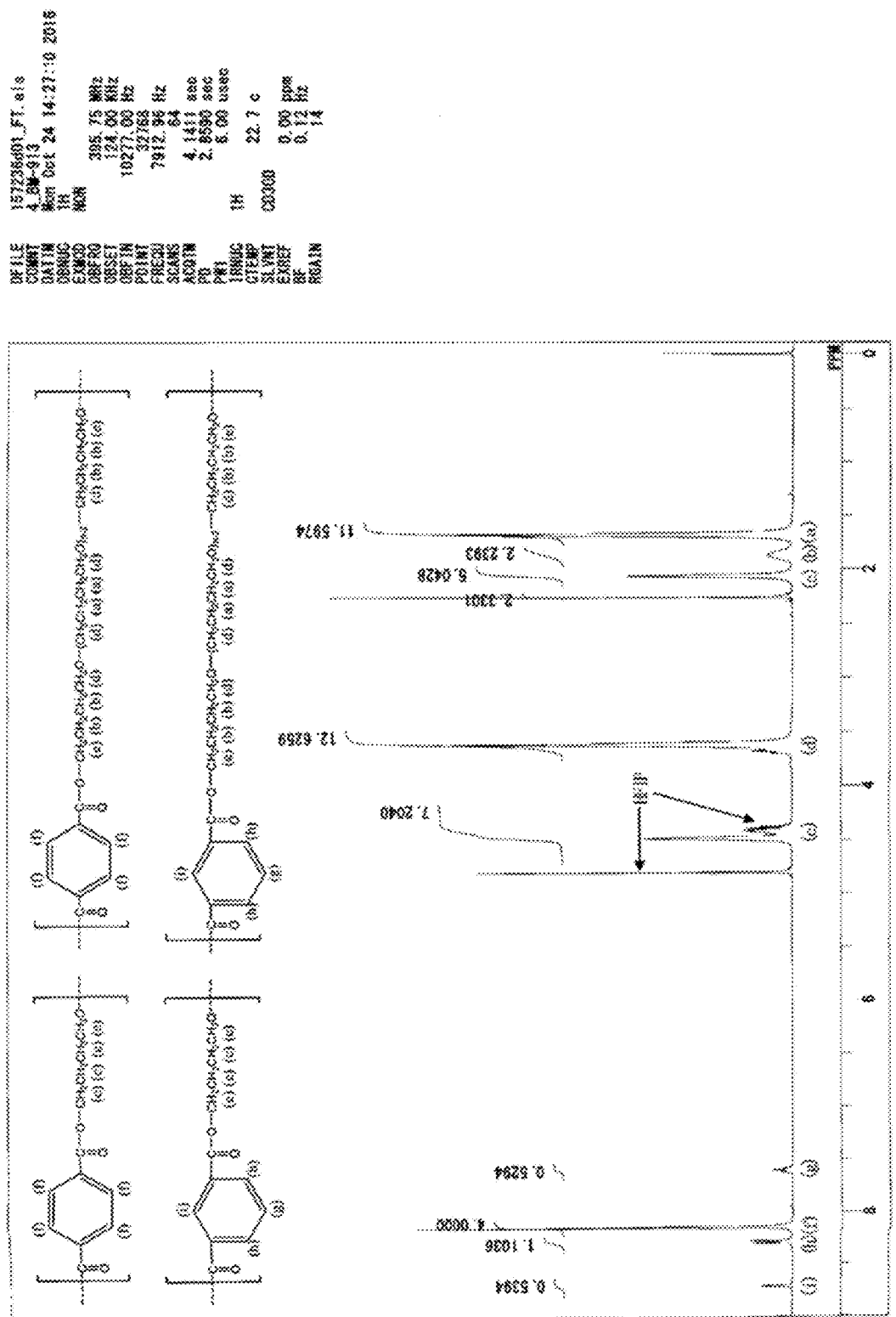
FIG. 16 is a $^1$H-NMR spectrum of the ester-based elastomer used in Example 3.
Figure 17:
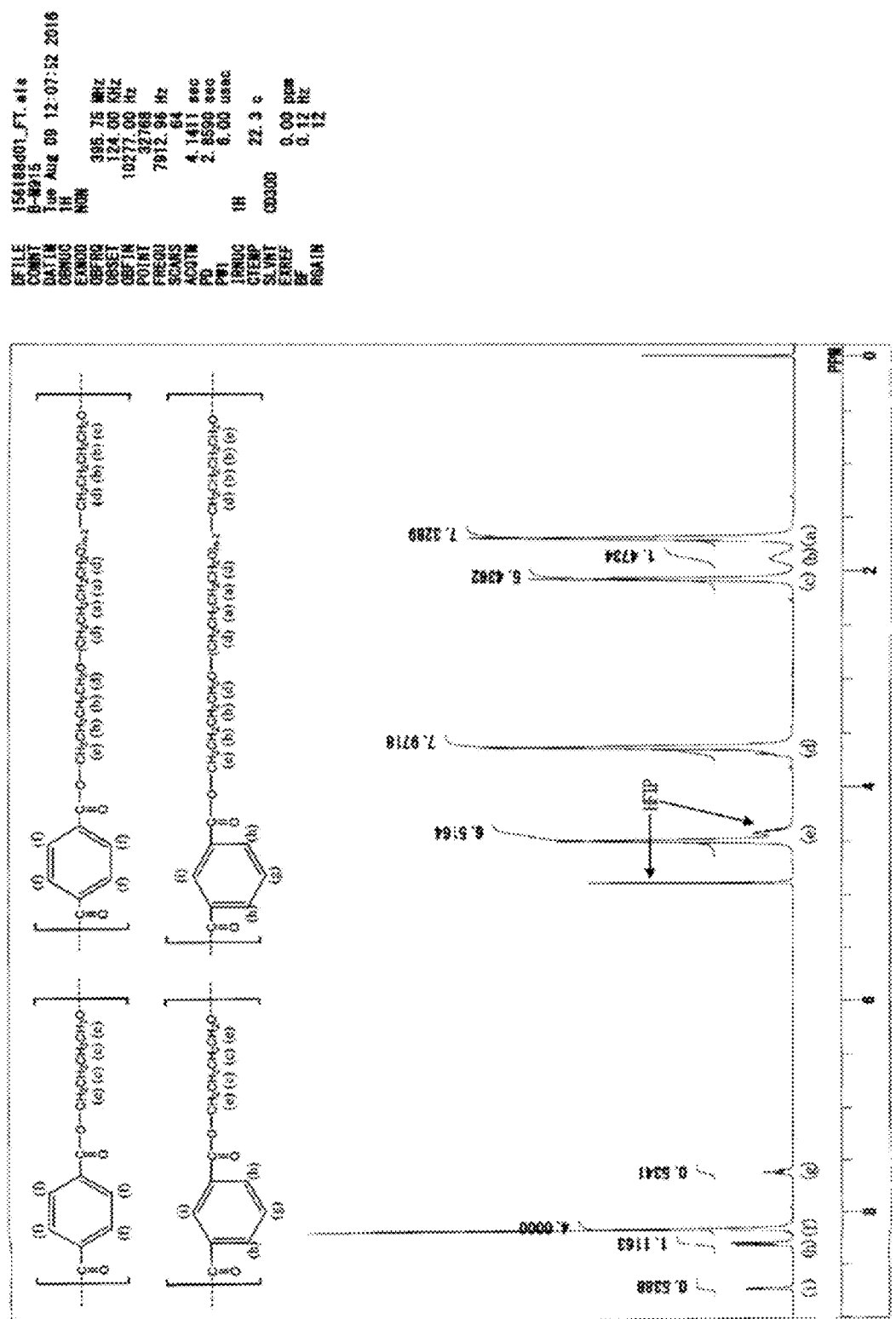
FIG. 17 is a $^1$H-NMR spectrum of the ester-based elastomer used in Example 4.
Figure 18:
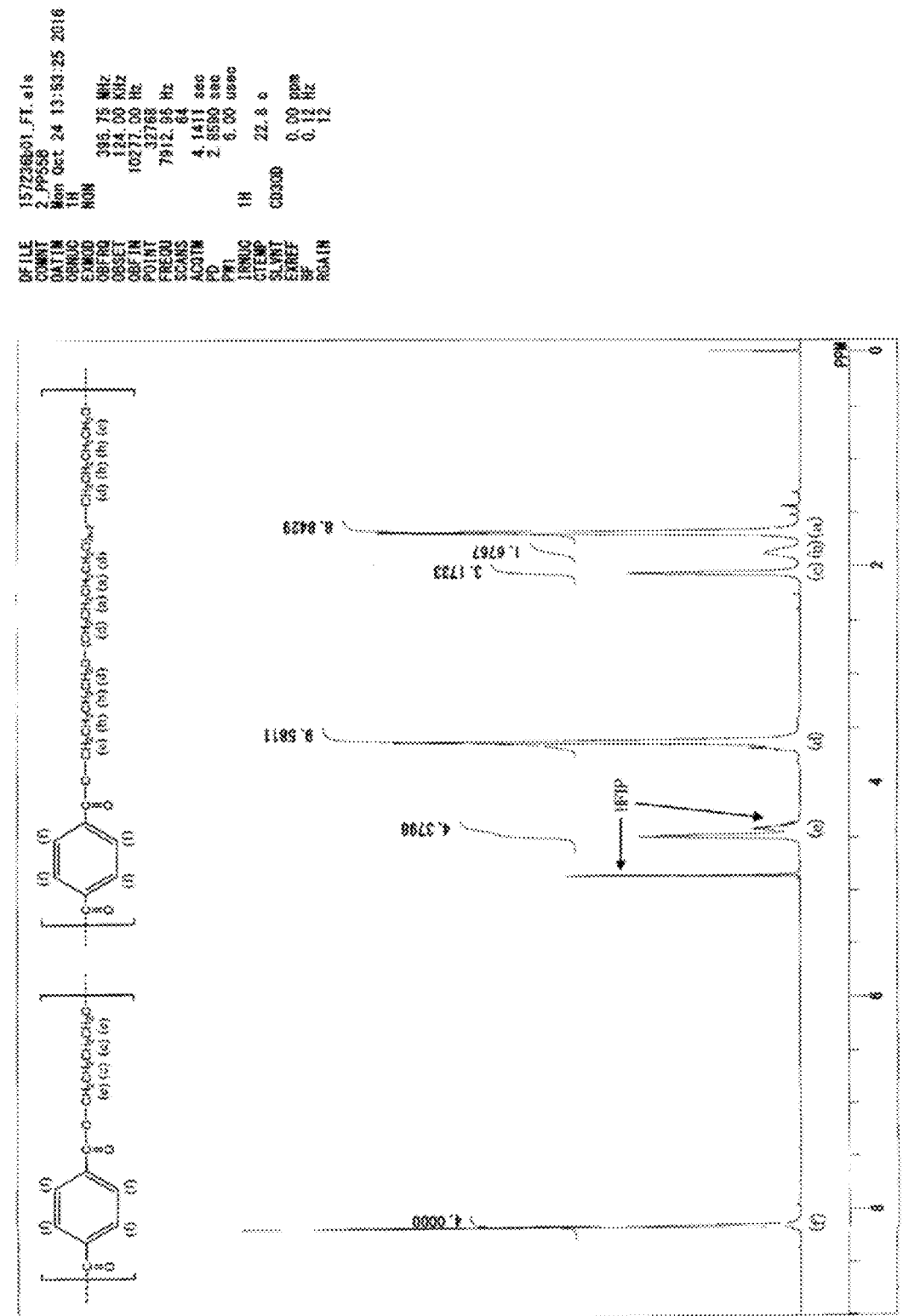
FIG. 18 is a $^1$H-NMR spectrum of the ester-based elastomer used in Example 5.
Figure 19:
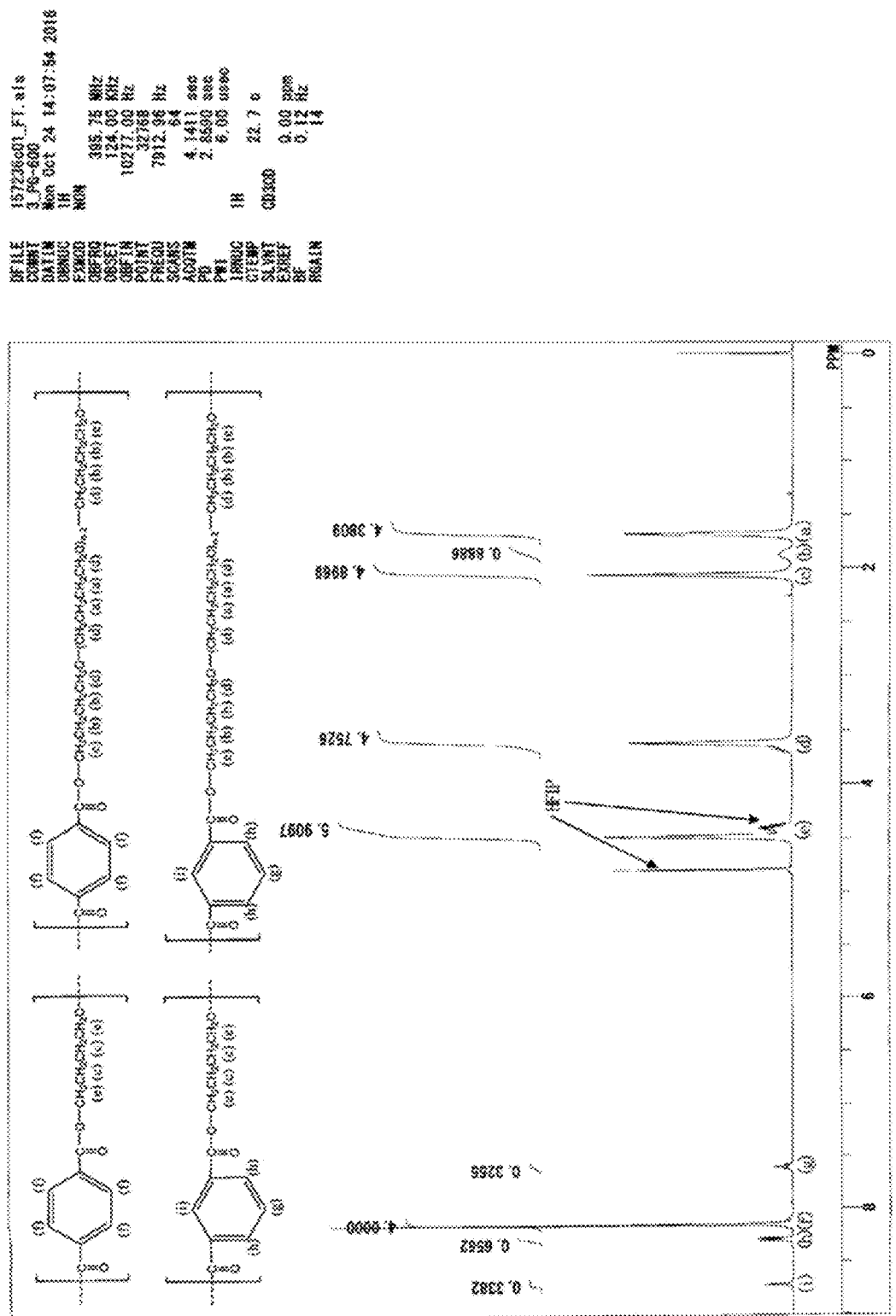
FIG. 19 is a $^1$H-NMR spectrum of the ester-based elastomer used in Example 6.

A sectional image of the obtained expanded molded article is shown in FIG. 13.

The hard segment amount, the terephthalic acid component amount, the isophthalic acid component amount, the melting point, the crystallization temperature, the heat of crystallization and the resin shore D hardness of the resin particles, the bulk density of the expanded particles, and the density, the average particle diameter, the average cell diameter (surface layer part), the average cell diameter (central part), the closed cell rate, the rebound resilience, the C hardness, the compression set, the 25% compression stress, the 50% compression stress and the fusion rate of the expanded molded articles, of Examples 1 to 11 and Comparative Examples 1 and 2, are summarized in Table 1.

TABLE 1

|  | Unit | Example | | | | | | |
| --- | --- | --- | --- | --- | --- | --- | --- | --- |
|  |  | 1 | 2 | 3 | 4 | 5 | 6 | 7 |
| Hard segment amount | mass % | 42 | 63 | 56 | 68 | 52 | 75 | 63 |
| Terephthalic acid component amount | mass % | 32 | 33 | 26 | 31 | 38 | 39 | 33 |
| Isophthalic acid component amount | mass % | 0 | 12 | 14 | 17 | 0 | 13 | 12 |
| Melting point Tm | ° C. | 164 | 146 | 125 | 135 | 183 | 166 | 146 |
| Crystallization temperature Tc | ° C. | 92 | 62 | 36 | 43 | 147 | 90 | 62 |

TABLE 1-continued

| | | | | | | | | |
|---|---|---|---|---|---|---|---|---|
| Heat of crystallization | mJ/mg | 18 | 19 | 10 | 16 | 24 | 25 | 19 |
| Resin D hardness | — | 38 | 38 | 34 | 37 | 44 | 50 | 38 |
| Expanded particle bulk density | g/cm$^3$ | 0.140 | 0.059 | 0.106 | 0.128 | 0.080 | 0.071 | 0.067 |
| Expanded molded article density | g/cm$^3$ | 0.180 | 0.077 | 0.173 | 0.157 | 0.106 | 0.105 | 0.125 |
| Average particle diameter | mm | 5.2 | 7.9 | 5.5 | 5.8 | 6.7 | 7.2 | 6.8 |
| Average cell diameter (surface layer part) | μm | 137 | 150 | 225 | 215 | 87 | 84 | 271 |
| Average cell diameter (central part) | μm | 35 | 56 | 64 | 51 | 27 | 40 | 104 |
| Closed cell rate | % | 71 | 89 | 74 | 76 | 72 | 79 | 73 |
| Rebound resilience | % | 74 | 65 | 70 | 56 | 69 | 41 | 63 |
| Expanded molded article C hardness | — | 49 | 28 | 33 | 39 | 33 | 46 | 34 |
| Compression set | % | 4 | 11 | 8 | 7 | 7 | 6 | 6 |
| 25% compression stress | kPa | 192 | 71 | 78 | 122 | 116 | 181 | 110 |
| 50% compression stress | kPa | 417 | 150 | 190 | 254 | 219 | 295 | 206 |
| Fusion rate | % | 12 | 60 | 30 | 35 | 5 | 38 | 56 |

| | | Example | | | | Comp. Ex. | |
|---|---|---|---|---|---|---|---|
| | Unit | 8 | 9 | 10 | 11 | 1 | 2 |
| Hard segment amount | mass % | 63 | 75 | 63 | 63 | — | 100 |
| Terephthalic acid component amount | mass % | 33 | 39 | 33 | 33 | — | — |
| Isophthalic acid component amount | mass % | 12 | 13 | 12 | 12 | — | — |
| Melting point Tm | °C. | 150 | 167 | 148 | 148 | — | 247 |
| Crystallization temperature Tc | °C. | 92 | 111 | 89 | 89 | — | 186 |
| Heat of crystallization | mJ/mg | 20 | 29 | 21 | 21 | — | 20 |
| Resin D hardness | — | 38 | 50 | 38 | 38 | — | — |
| Expanded particle bulk density | g/cm$^3$ | 0.144 | 0.091 | 0.170 | 0.101 | — | 0.122 |
| Expanded molded article density | g/cm$^3$ | 0.165 | 0.128 | 0.183 | 0.117 | 0.200 | 0.144 |
| Average particle diameter | mm | 3.4 | 3.9 | 2.1 | 2.6 | 4.6 | 4.2 |
| Average cell diameter (surface layer part) | μm | 193 | 92 | 105 | 140 | 197 | 180 |
| Average cell diameter (central part) | μm | 53 | 39 | 40 | 61 | 191 | 215 |
| Closed cell rate | % | 80 | 83 | 84 | 79 | 74 | 85 |
| Rebound resilience | % | 53 | 35 | 53 | 59 | 60 | 24 |
| Expanded molded article C hardness | — | 46 | 51 | 50 | 37 | 37 | 80 |
| Compression set | % | 7 | 7 | 4 | 7 | 5 | 23 |
| 25% compression stress | kPa | 194 | 212 | 273 | 149 | 120 | 1150 |
| 50% compression stress | kPa | 375 | 354 | 480 | 266 | 260 | — |
| Fusion rate | % | 56 | 34 | 50 | 58 | — | 72 |

From Table 1, it is found that the expanded molded articles of Examples 1 to 11 show high rebound resilience and low density.

<Measurement Example>

The hard segment amount of the ester-based elastomers of Examples 1 to 6, and the terephthalic acid component amount and the isophthalic acid component amount in the elastomers were measured according to the following method. The ester-based elastomers used in Examples 2, 7, 8, 10 and 11 and the ester-based elastomers used in Examples 6 and 9 were respectively the same.

An ester-based elastomer (40 mg) was dissolved in 2 g of 1,1,1,3,3,3-hexafluoro-2-propanol (HFIP-d$_2$, deuterated solvent) containing an internal standard tetramethylsilane (TMS). The obtained solution was measured on a $^1$H-NMR, type AL400 manufactured by JEOL Ltd. to obtain a $^1$H-NMR spectrum of the ester-based elastomer. $^1$H-NMR spectra of the ester-based elastomers of Examples 1 to 6 are shown in FIGS. 14 to 19.

The obtained spectra were compared to spectra of known substances, thereby finding that the ester-based elastomers of Examples 2 to 4 and 6 were formed with terephthalic acid components, isophthalic acid components and butanediol components.

From the obtained spectra, the area ratio of peaks corresponding to hydrogens (a) to (i) (see following chemical formulae) of the components was calculated (while assuming that the area corresponding to hydrogens of the terephthalic acid component corresponded to four hydrogen atoms, the basis was established as 4.0000). The calculated area ratio is indicated in Table 2.

TABLE 2

| | Example | | | | | |
|---|---|---|---|---|---|---|
| Component | 1 | 2 | 3 | 4 | 5 | 6 |
| a | 12.6937 | 7.7761 | 11.5974 | 7.3289 | 8.8429 | 4.3809 |
| b | 2.3468 | 1.5059 | 2.2393 | 1.4734 | 1.6767 | 0.8886 |
| c | 2.8200 | 4.6546 | 5.0428 | 5.4362 | 3.1733 | 4.8969 |
| d | 13.7878 | 8.4336 | 12.6259 | 7.9718 | 9.5811 | 4.7526 |
| e | 4.3905 | 5.7908 | 7.2040 | 6.5164 | 4.3798 | 5.9097 |
| f | 4.0000 | 4.0000 | 4.0000 | 4.0000 | 4.0000 | 4.0000 |

TABLE 2-continued

| Component | Example | | | | | |
|---|---|---|---|---|---|---|
| | 1 | 2 | 3 | 4 | 5 | 6 |
| g | — | 0.3620 | 0.5294 | 0.5341 | — | 0.3255 |
| h | — | 0.7368 | 1.1036 | 1.1163 | — | 0.6562 |
| i | — | 0.3661 | 0.5394 | 0.5388 | — | 0.3382 |

TABLE 3

| | Component | Example | | | | | |
|---|---|---|---|---|---|---|---|
| | | 1 | 2 | 3 | 4 | 5 | 6 |
| Molar ratio | Terephthalic acid component | 50 | 37 | 32 | 32 | 50 | 37 |
| | Isophthalic acid component | — | 13 | 18 | 17 | — | 13 |
| | Monobutanediol component | 35 | 43 | 41 | 44 | 40 | 46 |
| | Polybutanediol component | 15 | 7 | 9 | 6 | 10 | 4 |

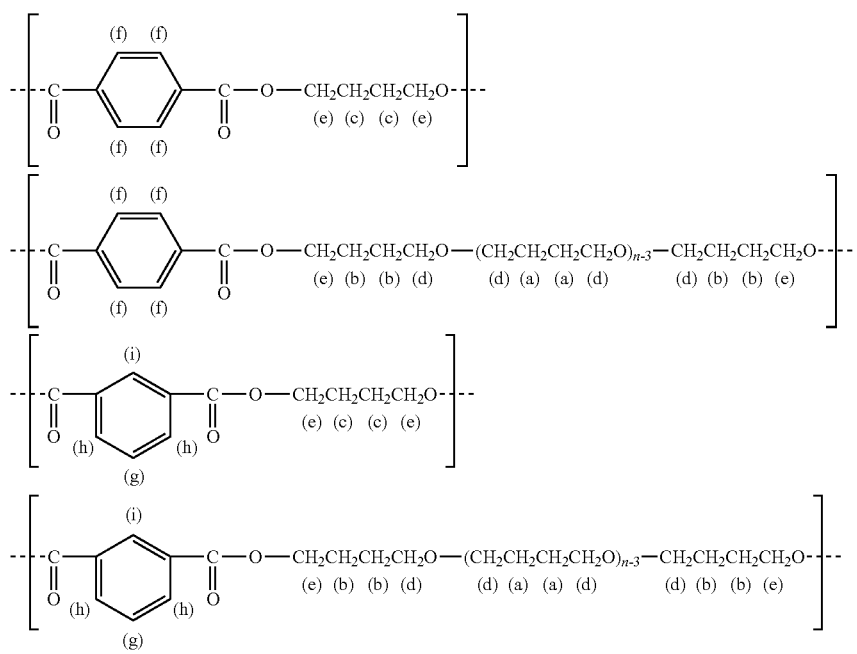

[Formula 1]

From the area ratio indicated in Table 2, the molar ratio and mass ratio of the components were calculated according to the following equations. The butanediol components were calculated as monobutanediol components and polybutanediol components. The calculation result is indicated in Table 3.

(1) Molar Ratio $100 \times (f/4) / [(f/4)+(i/1)+(c/4)+(b/8)]$  Terephthalic acid component:

$100 \times (i/1) / [(f/4)+(i/1)+(c/4)+(b/8)]$  Isophthalic acid component:

$100 \times (c/4) / [(f/4)+(i/1)+(c/4)+(b/8)]$  Monobutanediol component:

$100 \times (b/8) / [(f/4)+(i/1)+(c/4)+(b/8)]$  Polybutanediol component:

(2) Mass Ratio $100 \times 148 \times (f/4) / \{148 \times (f/4)+148 \times (i/1)+72 \times (c/4)+72 \times [d+(b/2)]/4\}$  Terephthalic acid component:

$100 \times 148 \times (i/1) / \{148 \times (f/4)+148 \times (i/1)+72 \times (c/4)+72 \times [d+(b/2)]/4\}$  Isophthalic acid component:

$100 \times 72 \times (c/4) / \{148 \times (f/4)+148 \times (i/1)+72 \times (c/4)+72 \times [d+(b/2)]/4\}$  Monobutanediol component:

$100 \times 72 \times [d+(b/2)]/4 / \{148 \times (f/4)+148 \times (i/1)+72 \times (c/4)+72 \times [d+(b/2)]/4\}$  Polybutanediol component:

TABLE 3-continued

| | Component | Example | | | | | |
|---|---|---|---|---|---|---|---|
| | | 1 | 2 | 3 | 4 | 5 | 6 |
| Mass ratio | Terephthalic acid component | 32 | 33 | 26 | 31 | 38 | 39 |
| | Isophthalic acid component | — | 12 | 14 | 17 | — | 13 |
| | Monobutanediol component | 11 | 19 | 16 | 20 | 15 | 23 |
| | Polybutanediol component | 58 | 37 | 44 | 32 | 48 | 25 |

From the area ratio indicated in Table 2, the compositional ratio (% by mass) of the hard segment and the soft segment in each elastomer was calculated according to the following equations. The calculation result is indicated in Table 1. It was defined that the hard segment is formed with polybutylene terephthalate components, polybutylene isophthalate components, terephthalic acid components and isophthalic acid components and the soft segment is formed with polybutanediol components.

$100 \times \{148 \times (f/4)+148 \times (i/1)+72 \times (c/4)\} / \{148 \times (f/4)+148 \times (i/1)+72 \times (c/4)+72 \times [d+(b/2)]/4\}$  (1) Hard Segment $100 \times \{72 \times [d+(b/2)]/4\} / \{148 \times (f/4)+148 \times (i/1)+72 \times (c/4)+72 \times [d+(b/2)]/4\}$  (2) Soft segment

The invention claimed is:
1. An ester-based elastomer expanded molded article comprising a fusion of expanded particles that contain an ester-based elastomer as a base resin, wherein the ester-based elastomer contains a hard segment and a soft segment,
wherein the hard segment is formed with
a dicarboxylic acid component, and
a dicarboxylic acid component and diol component, and
wherein the soft segment is an aliphatic polyether and/or polyester, and
wherein the dicarboxylic acid component contains a terephthalic acid component and a dicarboxylic acid component other than the terephthalic acid component and contains the dicarboxylic acid component other than the terephthalic acid component at 5 to 30% by mass.

2. The ester-based elastomer expanded molded article according to claim 1, wherein the ester-based elastomer has a heat of crystallization of 0 to 30 mJ/mg.

3. The ester-based elastomer expanded molded article according to claim 1, wherein the ester-based elastomer contains the hard segment at 30 to 80% by mass.

4. The ester-based elastomer expanded molded article according to claim 1, wherein the dicarboxylic acid component other than the terephthalic acid component is an isophthalic acid component.

5. The ester-based elastomer expanded molded article according to claim 1, wherein the expanded particles in the fusion have an average cell diameter at a central part of 10 to 200 μm and an average cell diameter at a surface layer part of 50 to 300 μm.

6. The ester-based elastomer expanded molded article according to claim 1, wherein the ester-based elastomer expanded molded article shows a density of 0.02 to 0.4 g/cm$^3$ and a rebound resilience of 50 to 100%.

7. The ester-based elastomer expanded molded article according to claim 1, which is used for any of an insole, a midsole and an outsole.

8. A midsole comprising the expanded molded article according to claim 7.

9. A sole comprising the midsole according to claim 8.

10. Ester-based elastomer expanded particles comprising an ester-based elastomer as a base resin and capable of providing an expanded molded article that comprises a fusion of expanded particles,
wherein the ester-based elastomer contains a hard segment and a soft segment,
wherein the hard segment is formed with
a dicarboxylic acid component, and
a dicarboxylic acid component and diol component, and
wherein the soft segment is an aliphatic polyether and/or polyester, and
wherein the dicarboxylic acid component contains a terephthalic acid component and a dicarboxylic acid component other than the terephthalic acid component and contains the dicarboxylic acid component other than the terephthalic acid component at 5 to 30% by mass.

11. The ester-based elastomer expanded particles according to claim 10, fulfilling any of the following requirements (ii) to (v):
(ii) the ester-based elastomer has a heat of crystallization of 0 to 30 mJ/mg;
(iii) the ester-based elastomer contains the hard segment at 30 to 80% by mass;
(iv) the ester-based elastomer expanded particles are capable of providing an expanded molded article in which expanded particles in the fusion have an average cell diameter at a central part of 10 to 200 μm and an average cell diameter at a surface layer part of 50 to 300 μm; and
(v) the ester-based elastomer expanded particles are capable of providing an expanded molded article showing a density of 0.02 to 0.4 g/cm$^3$ and a rebound resilience of 50 to 100%.

12. The ester-based elastomer expanded particles according to claim 11, wherein the dicarboxylic acid component other than the terephthalic acid component is an isophthalic acid component.

* * * * *